(12) United States Patent
Castro et al.

(10) Patent No.: US 12,549,031 B2
(45) Date of Patent: Feb. 10, 2026

(54) FAULT MANAGED POWER INCLUDING OPTICAL COMMUNICATION ELEMENTS

(71) Applicant: Panduit Corp., Tinley Park, IL (US)

(72) Inventors: Jose M. Castro, Naperville, IL (US); Walid Balid, Orland Park, IL (US); Masud Bolouri-Saransar, Orland Park, IL (US)

(73) Assignee: Panduit Corp., Tinley Park, IL (US)

( * ) Notice: Subject to any disclaimer, the term of this patent is extended or adjusted under 35 U.S.C. 154(b) by 2 days.

(21) Appl. No.: 18/808,606

(22) Filed: Aug. 19, 2024

(65) Prior Publication Data

US 2025/0096603 A1    Mar. 20, 2025

Related U.S. Application Data

(60) Provisional application No. 63/546,552, filed on Oct. 31, 2023, provisional application No. 63/538,552, filed on Sep. 15, 2023.

(51) Int. Cl.
| | |
|---|---|
| *G01R 31/52* | (2020.01) |
| *H02H 3/28* | (2006.01) |
| *H02J 13/00* | (2006.01) |

(52) U.S. Cl.
CPC ........ *H02J 13/00017* (2020.01); *G01R 31/52* (2020.01); *H02H 3/28* (2013.01)

(58) Field of Classification Search
CPC .... H02J 113/00017; G01R 31/52; H02H 3/28
See application file for complete search history.

(56) References Cited

U.S. PATENT DOCUMENTS

| | | | |
|---|---|---|---|
| 6,784,790 B1 | 8/2004 | Lester | |
| 8,297,854 B2 * | 10/2012 | Bickham | G02B 6/0288 385/124 |
| 8,781,637 B2 | 7/2014 | Eaves | |
| 8,880,917 B2 | 11/2014 | Kreiner et al. | |
| 9,091,154 B2 * | 7/2015 | Weerasinghe | G02B 6/3817 |
| 9,184,795 B2 | 11/2015 | Eaves | |
| 9,355,760 B2 * | 5/2016 | Finkelstein | G02B 6/4415 |
| 9,415,551 B2 * | 8/2016 | Gimblet | B29C 48/154 |
| 9,419,436 B2 | 8/2016 | Eaves et al. | |
| 9,523,790 B1 * | 12/2016 | Valishin | E21B 47/07 |

(Continued)

FOREIGN PATENT DOCUMENTS

| | | |
|---|---|---|
| CN | 104617573 A | 5/2015 |
| CN | 110829396 A | 2/2020 |

(Continued)

OTHER PUBLICATIONS

Qin Lei, et al. "Unified Space Vector Pwm Control For Current Source Inverter", Energy Conversion Congress And Exposition (ECCE), 2012 IEEE, IEEE Sep. 15, 2012 (Sep. 15, 2012), pp. 4696-4702, XP032467013, DOI: 10.1109/ECCE.2012.6342181, ISBN: 978-1-4673-0802-1, Section III. Pulse-Width-Amplitude-Modulation (PWAM); figures 11, 13, 15.

*Primary Examiner* — Hoi C Lau
(74) *Attorney, Agent, or Firm* — Peter S. Lee; Christopher S. Clancy; James H. Williams

(57) ABSTRACT

A solution is disclosed for providing fault-managed power systems using optical elements. The fault-managed power systems are able to provide safe and efficient power delivery utilizing optical fiber links to improve signal integrity, security, and reach of the system.

20 Claims, 17 Drawing Sheets

(56) References Cited

U.S. PATENT DOCUMENTS

| | | | |
|---|---|---|---|
| 9,529,170 B2* | 12/2016 | Sutehall | G02B 6/4433 |
| 9,557,511 B2* | 1/2017 | Gimblet | B29C 48/154 |
| 9,787,090 B2 | 10/2017 | Hikihara et al. | |
| 9,853,689 B2 | 12/2017 | Eaves | |
| 9,893,521 B2 | 2/2018 | Lowe et al. | |
| 10,291,019 B2* | 5/2019 | Chawgo | H02H 3/05 |
| 10,374,423 B2 | 8/2019 | Ibrahim et al. | |
| 10,374,424 B2 | 8/2019 | Zhyhinas et al. | |
| 10,468,879 B2 | 11/2019 | Eaves | |
| 10,541,543 B2 | 1/2020 | Eaves | |
| 10,606,005 B1* | 3/2020 | Martin Regalado | G02B 6/4436 |
| 10,714,930 B1 | 7/2020 | Weiss et al. | |
| 10,735,105 B2 | 8/2020 | Goergen et al. | |
| 10,790,997 B2 | 9/2020 | Jones et al. | |
| 11,061,456 B2 | 7/2021 | Jones et al. | |
| 11,063,630 B2 | 7/2021 | Arduini et al. | |
| 11,115,735 B2* | 9/2021 | Rousseaux | H04J 14/0212 |
| 11,133,668 B2* | 9/2021 | Chawgo | H02H 9/041 |
| 11,258,520 B2 | 2/2022 | Goergen et al. | |
| 11,973,343 B2* | 4/2024 | Hazani | H02H 3/08 |
| 2002/0038154 A1 | 3/2002 | Zimmermann et al. | |
| 2002/0046276 A1 | 4/2002 | Coffey et al. | |
| 2011/0305420 A1* | 12/2011 | Bickham | G02B 6/0288 385/77 |
| 2012/0217808 A1 | 8/2012 | Richardson et al. | |
| 2014/0205294 A1* | 7/2014 | Finkelstein | G02B 6/4416 29/857 |
| 2014/0225436 A1 | 8/2014 | Lester et al. | |
| 2014/0292530 A1* | 10/2014 | Weerasinghe | G02B 6/3817 340/854.7 |
| 2014/0369656 A1* | 12/2014 | Gimblet | G02B 6/4401 385/113 |
| 2016/0034416 A1 | 2/2016 | Chavez et al. | |
| 2016/0294500 A1 | 10/2016 | Chawgo et al. | |
| 2016/0294568 A1 | 10/2016 | Chawgo et al. | |
| 2016/0320582 A1* | 11/2016 | Gimblet | B29D 11/00875 |
| 2016/0329703 A1* | 11/2016 | Chawgo | H02H 9/041 |
| 2017/0279443 A1 | 9/2017 | Morimoto | |
| 2018/0313886 A1 | 11/2018 | Mlyniec et al. | |
| 2019/0267800 A1* | 8/2019 | Chawgo | H02H 3/05 |
| 2020/0020382 A1 | 1/2020 | Stoneham | |
| 2020/0081209 A1* | 3/2020 | Martin Regalado | H01B 9/02 |
| 2020/0196035 A1* | 6/2020 | Rousseaux | G02B 6/3596 |
| 2020/0235949 A1 | 7/2020 | Jones et al. | |
| 2020/0295559 A1 | 9/2020 | Eaves et al. | |
| 2020/0295955 A1 | 9/2020 | O'Brien et al. | |
| 2020/0389329 A1 | 12/2020 | Jones et al. | |
| 2021/0044145 A1* | 2/2021 | Hazani | H02J 13/00002 |
| 2021/0063447 A1 | 3/2021 | Eaves | |
| 2021/0075419 A1 | 3/2021 | Manjrekar et al. | |
| 2021/0159728 A1* | 5/2021 | Mestezky | H02J 3/46 |
| 2021/0167813 A1 | 6/2021 | Arduini et al. | |
| 2021/0167814 A1 | 6/2021 | Arduini et al. | |
| 2021/0273564 A1 | 9/2021 | O'Brien et al. | |
| 2021/0294402 A1 | 9/2021 | Jones et al. | |
| 2022/0086540 A1* | 3/2022 | Rousseaux | H04J 14/0206 |
| 2022/0116122 A1 | 4/2022 | Goergen et al. | |
| 2022/0116238 A1 | 4/2022 | O'Brien et al. | |
| 2022/0190587 A1 | 6/2022 | Eaves et al. | |
| 2025/0096603 A1* | 3/2025 | Castro | G01R 31/52 |
| 2025/0096908 A1* | 3/2025 | Castro | H04L 12/10 |

FOREIGN PATENT DOCUMENTS

| | | |
|---|---|---|
| EP | 2282616 A1 | 2/2011 |
| EP | 2432134 A1 | 3/2012 |
| EP | 3726719 A1 | 10/2020 |
| EP | 3414808 B1 | 5/2022 |
| EP | 3788743 B1 | 5/2023 |
| JP | 2005020873 A | 1/2005 |
| JP | 2007018581 A | 1/2007 |
| WO | 2019171271 A1 | 9/2019 |
| WO | 2021092350 A1 | 5/2021 |

* cited by examiner

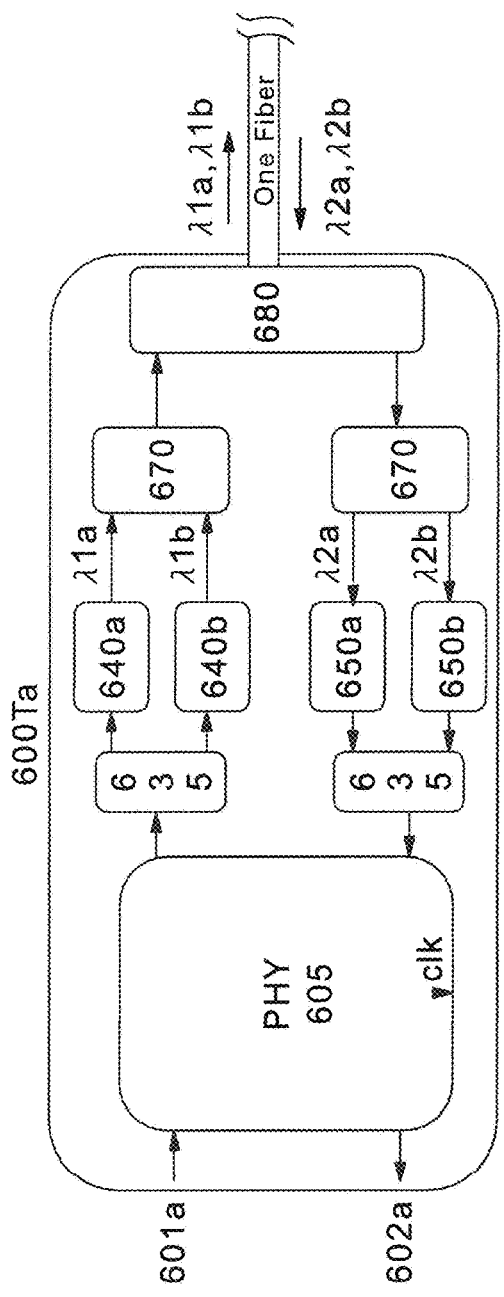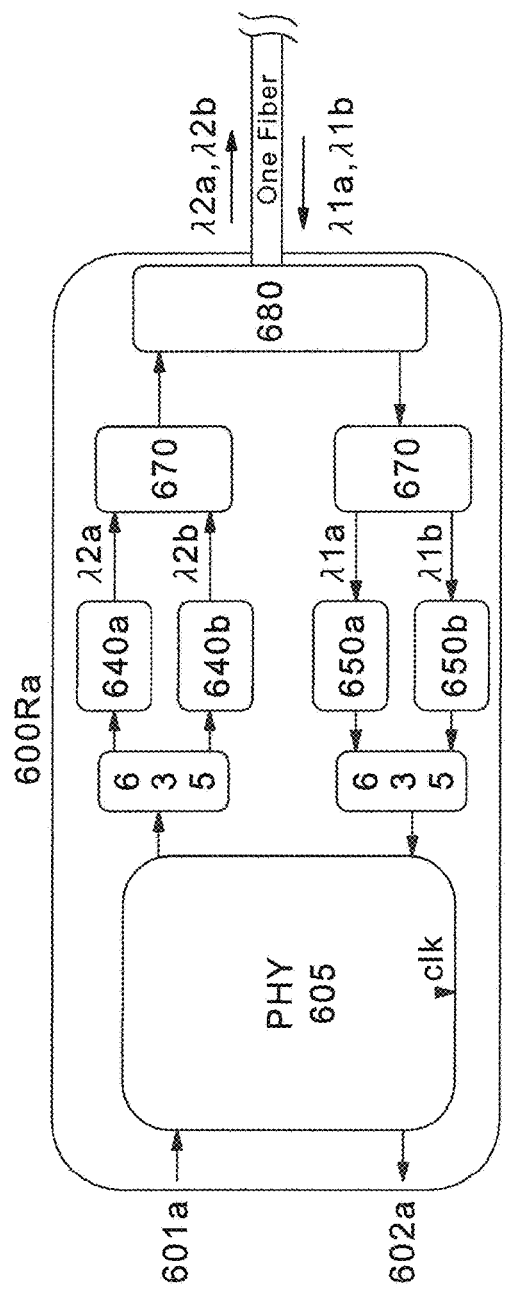

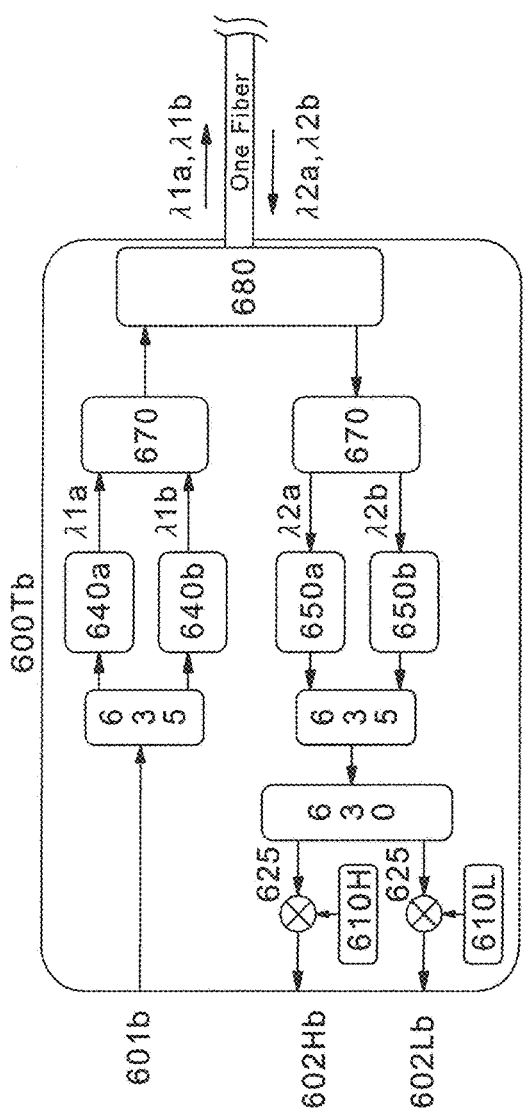
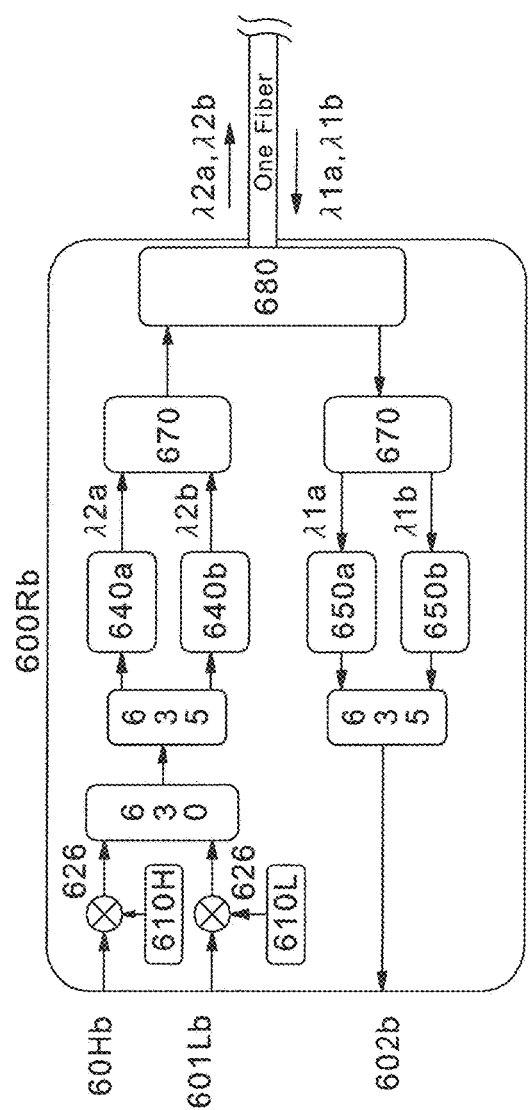

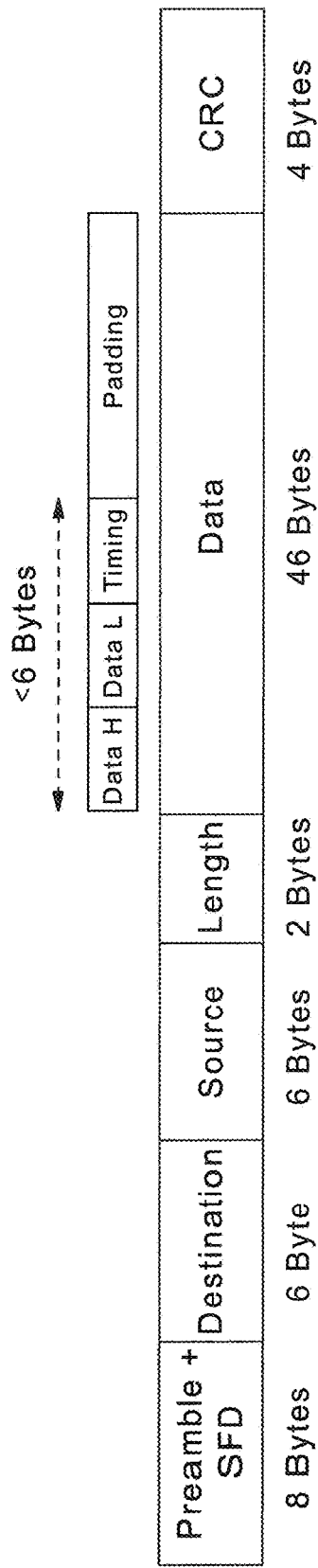

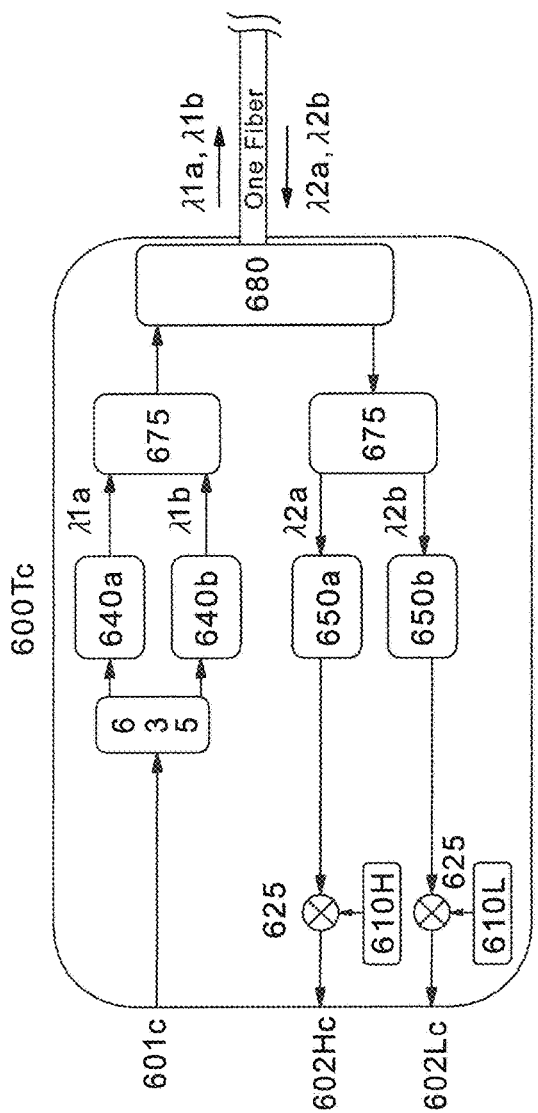
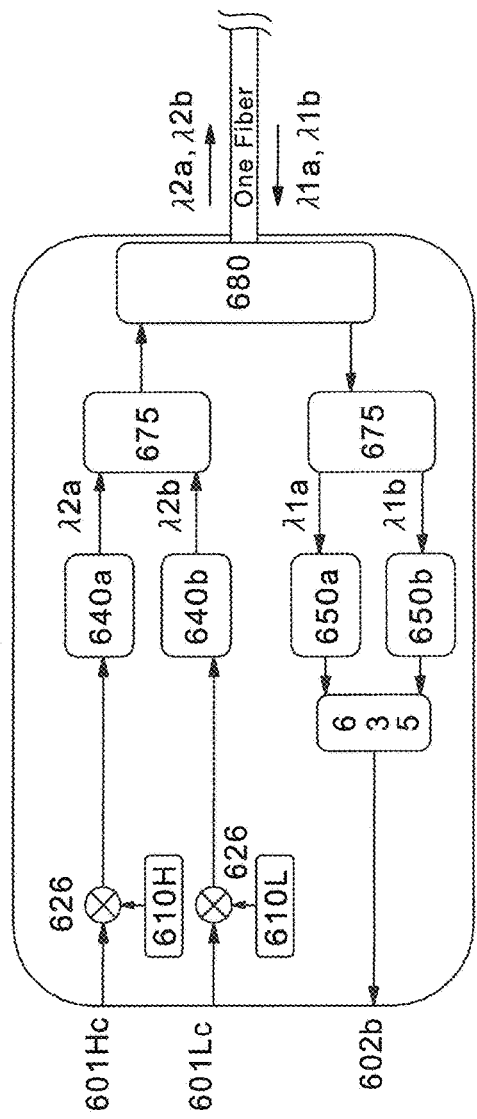
Fig.7A
Fig.7B

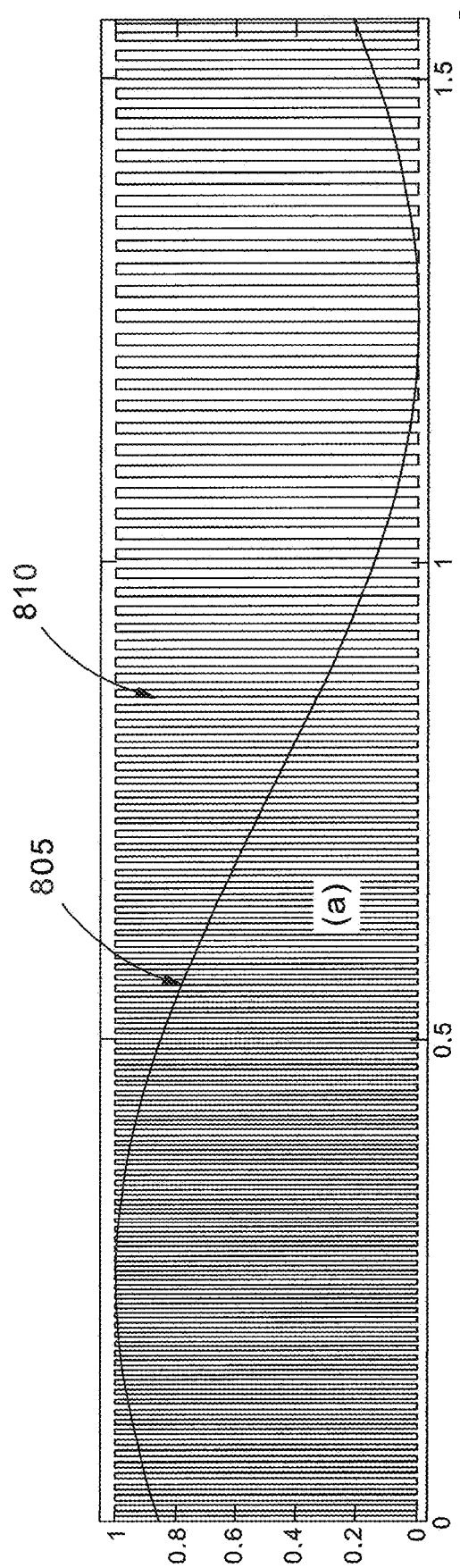
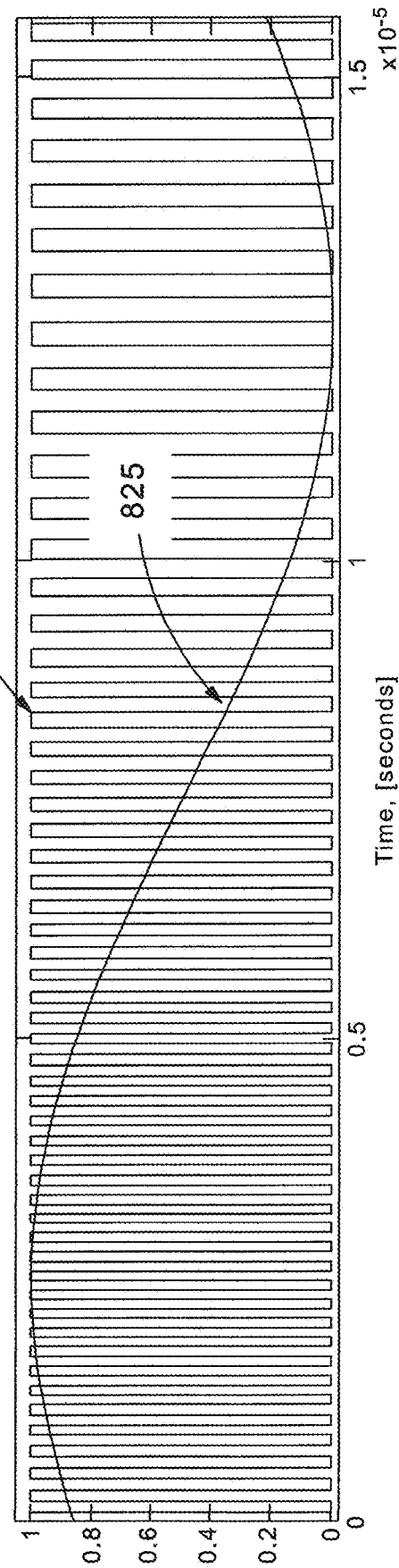
Fig. 9A
Fig. 9B

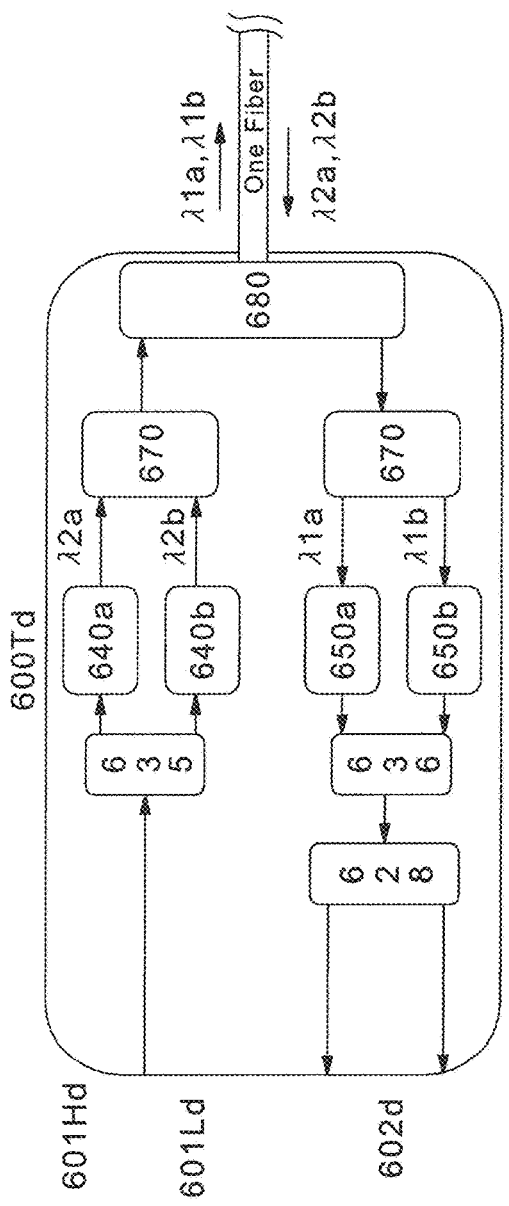
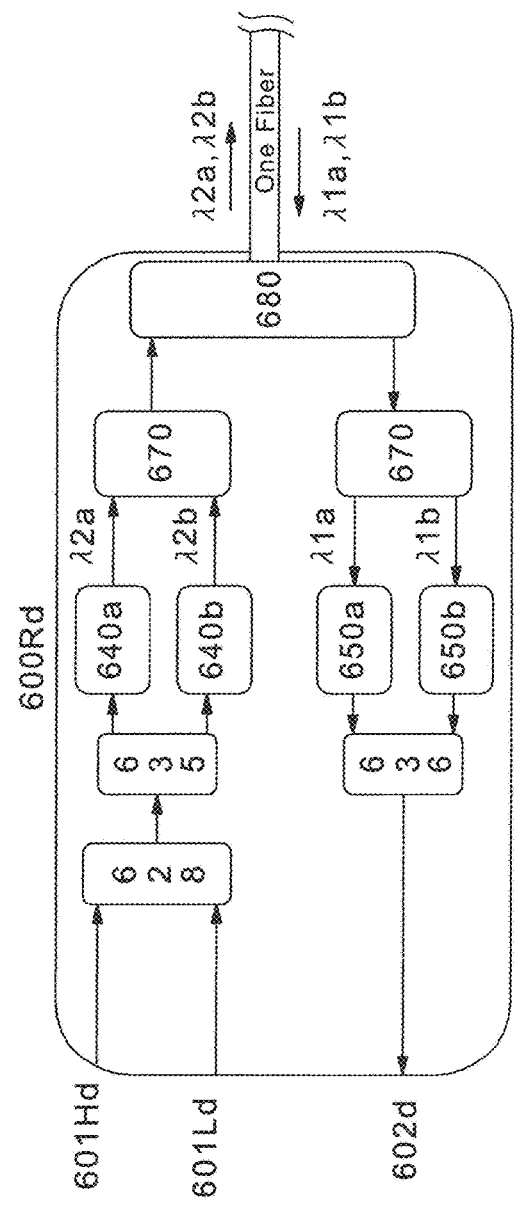

FAULT MANAGED POWER INCLUDING OPTICAL COMMUNICATION ELEMENTS

CROSS-REFERENCE TO RELATED APPLICATION(S)

The application claims benefit to both U.S. Provisional Patent Application No. 63/538,552, filed on Sep. 15, 2023, and U.S. Provisional Patent Application No. 63/546,552, filed on Oct. 31, 2023, the entirety of all of which are hereby incorporated by reference herein.

TECHNICAL FIELD

The application relates to the field of fault-managed power systems using optical elements. In particular, the application discloses active and passive devices for safe and efficient power transmission infrastructure required to energize communication and computing network equipment.

BACKGROUND

Enterprise networks traditionally use unshielded twisted pair (UTP) copper cables such as CAT 6, and power-over-Ethernet, (POE), for power and data transmission between network devices. However, copper infrastructure confines the network distances to 100 m and has reached the point where achieving efficient transmission at data rates beyond 10G over 100 m of the copper cable becomes challenging and, in some cases, impractical.

Optical networks can provide secure and virtually limitless bandwidth for very long distances that can cover the requirement of premises and campus networks from core to access layers. Also, due to the high bandwidth, power consumption per transmitting bit and latency are significantly lower than UTP channels. Optical systems are broadly deployed in the access, metro, core, and data centers networks providing unmatched bandwidth capacity. Optical networks support wired and wireless applications, access, and such as distributed high-speed access points (picocells, femtocells), interconnects, high-resolution security cameras, and distributed audio/video using 4K 8K display systems, among others. While optical fiber can efficiently transmit data at high data rates over longer distances, it cannot efficiently transmit the power needed to energize equipment.

Electrical power is often not always readily available at the end device location, which either requires installing power infrastructure or transmitting power to the desired site. Although it could be advantageous to transmit data and power over optical fiber, existing technology for transmission of power over optical signal is still immature.

Class 4 Power (C4P) is an efficient fault-managed power system whose functionalities and requirements have been recently included in the latest versions of the National Electrical Code (NEC) and, underwriters' Laboratories, documents, UL 1400-1 and UL 1400-2. C4P utilizes higher voltage than traditional power over Ethernet, up to 450 V, enabling more efficient transmission of power.

C4P can energize several communication, computing, and switching devices such as distributed antenna systems (DAS), passive optical LAN (POL), active zone switches, access points, 5G antennas, remote access cabinets, and small cells. This technology can simplify the deployment of networks and edge devices in enterprise facilities such as airports, stadiums, and other venues, hospitality, warehouses, manufacturing plants, and offices.

SUMMARY

Currently, C4P may utilize pulsed power (PP) methods as described in U.S. patent application Ser. No. 17/512,081 filed Oct. 27, 2021 (published as US 2022/0050135 on Feb. 17, 2022), the entirety of which is hereby incorporated by reference herein. Included in an exemplary PP system may be power transmitters, power receivers, and a compliant C4P cable. The power transmitter transmits a pulse power signal for a duration, $T_p$, and stops the power transmission during $T_m$. During $T_m$, the PP system comprising the power transmitter and receiver monitors and checks the safety of the channel, by evaluating electrical changes in circuits parameters. If the variations are inside tolerances, the power transmitter sends another pulse power signal. If the variations are outside tolerances, the power transmitter ceases transmission of the pulse power signal. The power transmitter and power receiver share data including control parameters, using digital or analog signals.

Similarly, a fault-managed power concept can be also applied to systems delivering direct current (DC) power as described, for example, in U.S. Provisional Patent Application No. 63/457,191 filed Apr. 5, 2023, the entirety of which is hereby incorporated by reference herein. A C4P DC system may simplify the complexity of the transmitter and receiver devices while providing better signal integrity for the monitoring and control signals avowing harmonics or noise related to the power switching.

However, in C4P DC systems $T_m=0$, which increases requirements for sensing faults and shuts down the power. Depending on the transmitting current and the used topology (point-to-point or multipoint) C4P DC could require more reliable and faster communication among power transmitters and receivers. The optical fiber systems as described herein, may be applied for both types of C4P systems: PP or DC. In both cases, the incorporation of optical fiber systems provides the benefits of reducing the complexity of filters and other components of the systems.

Therefore, disclosed herein are apparatuses and methods for C4P that employ optical fiber communication to improve the reach and signal integrity of the controlling and monitoring signals to facilitate the deployment of point-to-point or multidrop topology. The use of optical fiber with C4P fault-detection systems provides excellent signal integrity for the control/monitoring signals due to low attenuation, EMI immunity, and zero crosstalk while making the channels less susceptible to malicious attacks.

According to some embodiments, a fault-management power system is disclosed, the fault-management power system comprising a power transmitter configured to: control a power switch to disconnect the power transmitter from a power source during a system initialization mode, control a low power switch to connect to a low power source and power an optical subassembly, determine a predetermined condition of whether at least one optical fiber port and at least one electrical port is connected to a hybrid cable, and control an optical data interface to transmit a connection request to a power receiver based on the determination, receive, via the optical subassembly, a reply to the connection request from the power receiver, receive, via the optical subassembly, a diagnostic message from the power receiver, conduct a fault detection test, and determine whether a power transmission condition is met based on at least the diagnostic message and the fault detection test, and control transmission of high voltage power to the power receiver based on the determination. The fault-management power system also comprises a hybrid cable including both optical fibers and conductive wires, the hybrid cable coupled to the power transmitter and the power receiver, and wherein the optical subassembly is configured to communicate with the power receiver using the optical fibers, and wherein the high voltage power is transmitted using the conductive wires.

A detailed description of these and other non-limiting exemplary embodiments of the C4P system is set forth below together with accompanying drawings.

BRIEF DESCRIPTION OF THE DRAWINGS

FIG. 4A is a block diagram illustrating a power transmitter included in the class 4 DC power system, according to a first embodiment.

FIG. 4B is a block diagram illustrating a power receiver included in the class 4 power DC system, according to the first embodiment.

FIG. 5A is a block diagram illustrating a power transmitter included in the class 4 power DC system, according to a second embodiment.

FIG. 5B is a block diagram illustrating a power receiver included in the class 4 power DC system, according to the second embodiment.

FIG. 6A illustrates an exemplary data frame transmitted by the power transmitter in the class 4 power DC system, according to some embodiments.

FIG. 6B illustrates an exemplary data frame transmitted by the power receiver in the class 4 power DC system, according to some embodiments.

FIG. 7A is a block diagram illustrating a power transmitter included in the class 4 power DC system, according to a third embodiment.

FIG. 7B is a block diagram illustrating a power receiver included in the class 4 power DC system, according to the third embodiment.

FIG. 9A is a graph illustrating an exemplary encoding of an analog signal to a pulse width modulated signal at the power receiver included in the class 4 power DC system shown in FIG. 3, according to some embodiments.

FIG. 9B is a graph illustrating an exemplary decoding of a received pulsed signal by the power receiver included in the class 4 power DC system shown in FIG. 3, according to some embodiments.

FIG. 10A is a block diagram illustrating a power transmitter included in the class 4 power DC system, according to the fourth embodiment.

FIG. 10B is a block diagram illustrating a power receiver included in the class 4 power system, according to the fourth embodiment.

DETAILED DESCRIPTION

Figure 1A:
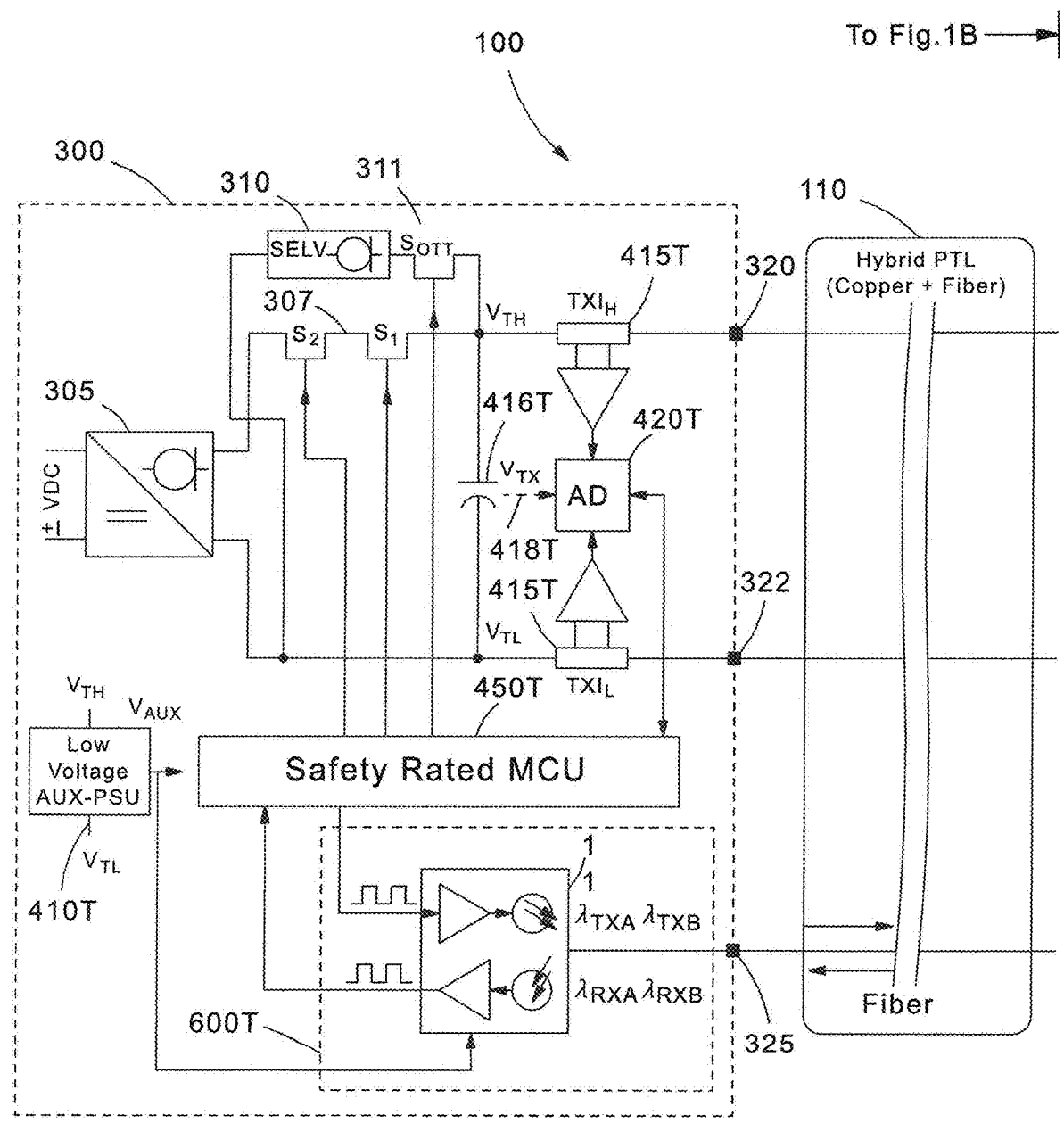
FIG. 1A is a portion of a circuit block diagram of an exemplary class 4 power DC system, according to some embodiments of the present disclosure.

As required, detailed non-limiting embodiments are disclosed herein. However, it is to be understood that the disclosed embodiments are merely exemplary and may take various and alternative forms. The figures are not necessarily to scale, and features may be exaggerated or minimized to show details of particular components. Therefore, specific structural and functional details disclosed herein are not to be interpreted as limiting, but merely as a representative basis for teaching one skilled in the art.

Disclosed herein are novel apparatus and methods for safe and efficient power delivery utilizing optical fiber links to improve signal integrity, security, and reach of the system. The optical fiber systems enable signal transmissions to longer distances at faster speeds, which in turn may be used to energize network, computing, or storage devices for distances up to 10 km without signal regeneration covering point-to-point or multipoint systems. The disclosed C4P systems utilize low-complexity power receivers, where the digitalization and most of the processing of safe protocols is performed by the power transmitter. In addition, the disclosed C4P systems utilize novel calibration methods using switching loads to improve accuracy and real-time monitoring of the system.

In a C4P system, sensing, monitoring, and communication are critical to control within specified guidelines and tolerances due to the harmful effects of human exposure to the transmitted current. According to the requirements provided in UL-1400-1, the allowable exposure time to the high voltage power in C4P is $Te \leq 3.8$ milliseconds for 450 V RMS. In a PP system, the high voltage power transmission time for transmitting power, $Tp$, was set to be less than the exposure time, $Te$, to ensure this safety requirement ($Tp < Te$), and $Tm \approx k \ast Tp$, where $0 < k \leq 1$, for sensing and monitoring to ensure the sensing and monitoring time periods last as long as, or less than, the power transmission time period.

Now in the C4P DC systems disclosed herein, there is no dedicated sensing and monitoring time for faults on the transmission line where the power is brought down to a low state (i.e., the sensing/monitoring time is zero, Tm=0) because the high voltage power is being transmitted continuously as opposed to being pulsed. So, to enable the C4P DC systems to abide by the guidelines in UL 1400-1, the requirements for sensing faults and enacting shut downs in the power are increased. In other words, depending on the transmitting current and the used topology (point-to-point or multipoint) C4P DC may require more reliable and faster communication among power transmitters and receivers, which can be provided by the incorporation of optical fiber systems for communicating information between the power transmitters and receivers. The incorporation of optical fiber systems provides the added benefits of reducing the complexity of filters and other components of the systems.

A C4P DC system is disclosed that combines the power transmission safety and efficiency of C4P and the high bandwidth of fiber. The C4P DC system can facilitate deployment of high bandwidth end devices, using reduced size cable, improving reliability and network management.

Figure 1B:
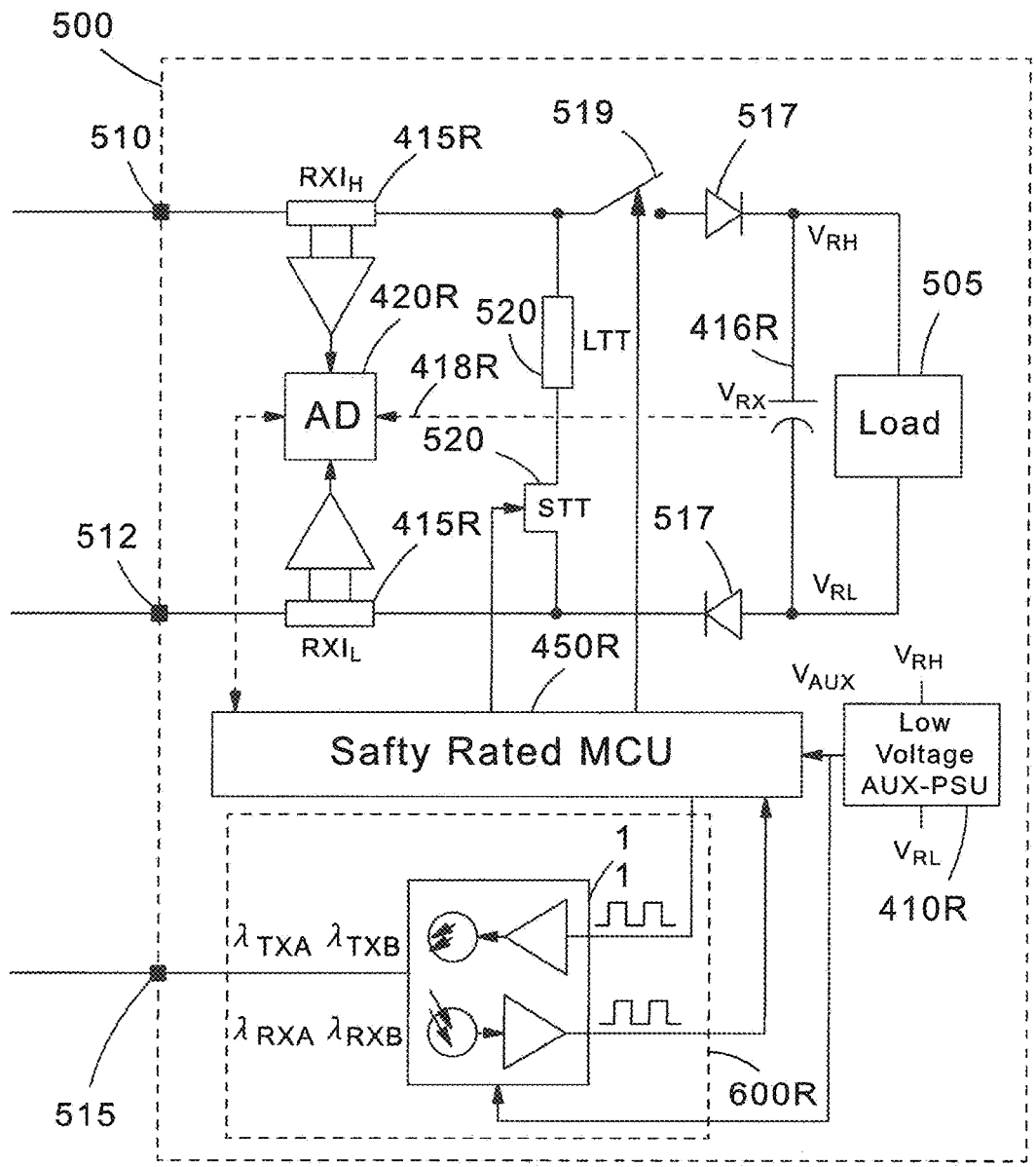
FIG. 1B is a portion of the circuit block diagram of the exemplary class 4 power DC system shown in FIG. 1A, according to some embodiments of the present disclosure.

FIGS. 1A and 1B show a schematic circuit diagram of a C4P DC system 100 comprising a power transmitter 300 and a power receiver 500, using an optical communication system. The optical communication system includes a hybrid cable 110 including copper or aluminum conductors and one or more optical fibers. According to other embodiments, the optical communication system can be deployed using non-hybrid cables, where the electrical power conductors and optical fiber (glass or plastic optical fiber, POF) are in separate cables. Depending on the installation, graded multimode fiber, MMF, or POF can be used as the optical media comprising the fiber portion of the hybrid cable 110. However, Single Mode Fiber (SMF), can be advantageous for longer reaches and to provide high bandwidth communication to the end device, powered by the power receiver 500 as disclosed herein.

The power transmitter 300 and power receiver 500 comprise several component elements used for safe power delivery. For example, the power transmitter 300 includes a high power supply (PSU) 305 with a programmable current limiter, a set of redundant power switches 307 to enable/disable the power transmission, and a switched Safety Extra Low Voltage (SELV) source 310 used to provide safe power, e.g., 24V or 48V, required to power circuits than need to operate during the initialization or fault recovery to a power receiver(s) 500.

Each power transmitter 300 and power receiver 500 includes a low voltage auxiliary power supply 410T (for the transmitter) and 410R (for the receiver) to power control and communication circuits such as a microcontroller unit (MCU) 450T on the power transmitter 300 side, and a similar MCU 450R on the power receiver 500 side, as well as optical subassemblies 600T on the power transmitter 300 side and optical subassemblies 600R on the power receiver 500 side. Each power transmitter 300 and power receiver 500 includes at least two current sensing circuits: two current sensing circuits 415T for the power transmitter 300, and two current sensing circuits 415R for the power receiver 500. Each sensing circuit includes a calibrated load, e.g., TXIH or TXIL for the power transmitter 300, or RXIH or RXIL for the power receiver 500, which are placed at the high and low voltage sides of the circuits as shown in FIG. 1B. The calibrated load 505 produces a voltage proportional to the circulating current, which is amplified and then digitalized by an analog-to-analog-to-digital converter (ADC) 420T on the power transmitter 300 side, or ADC 420R on the power receiver 500 side.

Each power transmitter 300 and power receiver 500 may include a DC BUS Voltage sensing unit 418T and 418R, on the power transmitter 300 and power receiver 500 respectively, connected to capacitors 416T and 416R, on the power transmitter 300 and power receiver 500, respectively. In each of the power transmitter 300 or the power receiver 500, the corresponding voltage sensing unit 418T or 418 R provides voltage signals to the respective ADCs 420T or 420R. Those ADCs are connected to their respective MCUs (e.g, MCU 450T in the case of the transmitter 300 and MCU 450R in the case of the power receiver 500), which also includes diodes 517 to prevent reverse current from the DC bus bulk capacitor.

The MCUs 450T, 450R in both the power transmitter 300 and the power receiver 500, respectively, include processing and memory capabilities. The MCUs 450T/450R in both the power transmitter 300 and the power receiver 500, respectively, execute the safety protocol, including the operation of the switches, and also can manage the communication protocol from the power transmitter 300 to the power receiver 500. The MCUs 450T and 450R in both the power transmitter 300 and the power receiver 500, respectively, utilize corresponding optical subassemblies 600T or 600R, to provide optical communication between the power transmitter 300 and one or more power receivers 500. Each optical subassembly 600T and 600R in the power transmitter 300 and the power receiver 500, respectively, consists of at least one optical source, driver circuits, photoreceivers, amplifiers, and optical coupling elements as described in the following section of this disclosure.

The power receiver 500 includes a load disconnect switch 519 to isolate the load 505 after fault detection or during initialization of fault recovery.

Another disclosed feature of the embodiments shown in FIGS. 1A and 1B, is the switched reference load 520, placed at the power receiver 500, which is used for testing and verification of the sensing and ADC circuits, during initialization, fault recovery, or even operation (i.e., on-the-fly) as is described later in the disclosure.

Initialization Method

Figure 2:
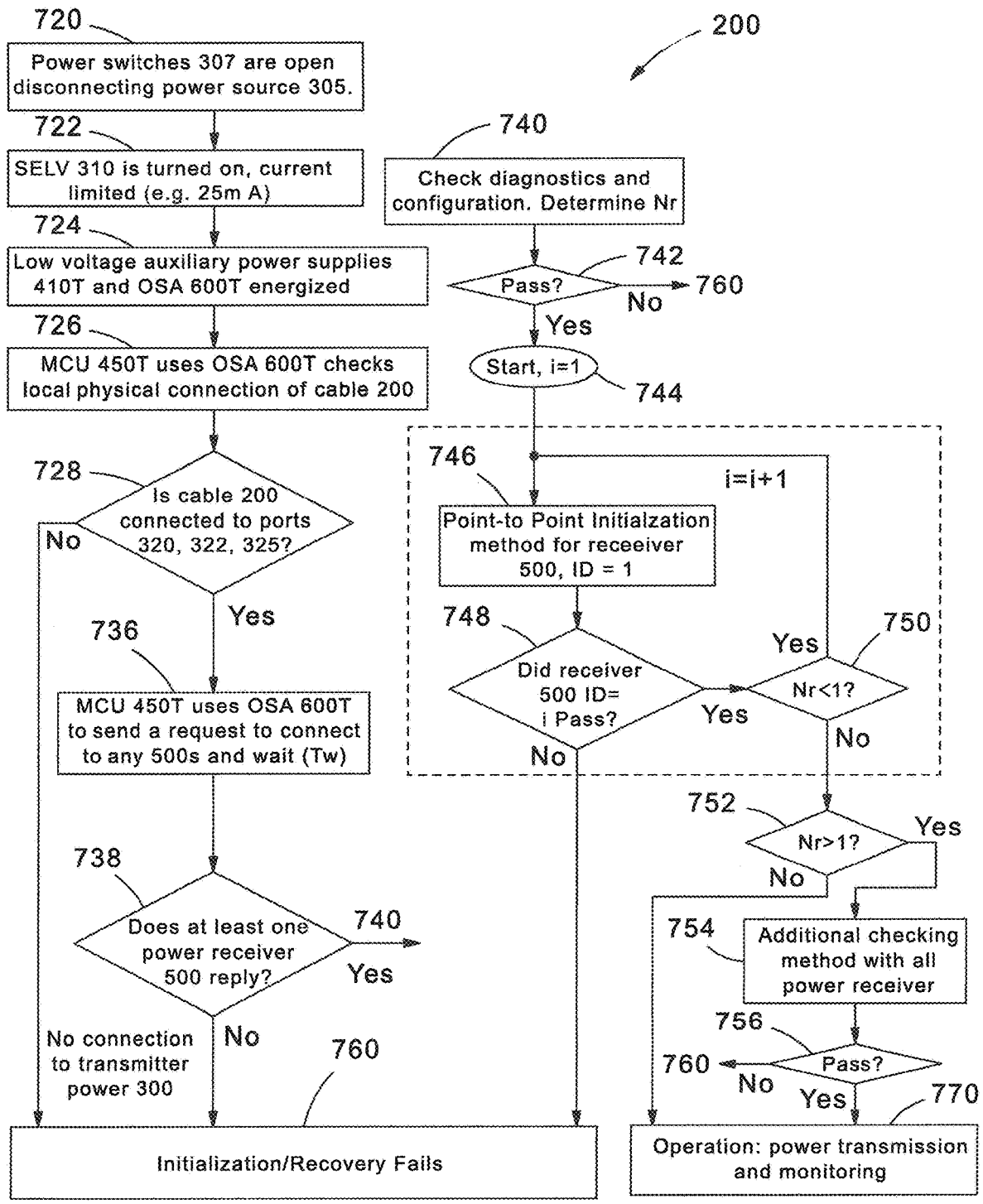
FIG. 2 is an exemplary flow diagram describing exemplary initialization, fault recovery, and testing processes for the class 4 power DC system, according to some embodiments of the present disclosure.

A flow diagram 200 of a system startup process (initialization) or fault recovery process for the C4P DC system is shown in FIG. 2, where the processes are applicable to both point-to-point topologies (Nr=1) and multipoint topologies (Nr>1), where Nr is the number of active power receivers 500. The system startup process (initialization), fault recovery process for the C4P DC system, and/or other processes described herein may be implemented by a solution including software, hardware, middleware, and/or circuitry included in the C4P DC system 100 such as, for example, the MCU 450T or MCU 450R.

At 720, within the power transmitter 300, the power switches 307 are opened to disconnect the power supply 305. At this step 720, the switch 519 should be open, disconnecting the load 505 at the power receiver 500. However, since communication has not yet been established between the power transmitter 300 and the power receiver 500, at this step 720 this condition cannot yet be verified.

At 722, the SELV 310 (e.g., 24~48V DC) is active via switch SoTT 311 (see FIG. 1A), but the current is limited (e.g., <25 mA), putting low voltage on the ports line illustrated by the hybrid cable 110.

At 724, the low voltage auxiliary power supply 410T is active and energizes the MCU 450T and the optical subassembly ("OSA") 600T found on the power transmitter 300 side.

At 726, the MCU 450T senses whether local electrical ports 320, 322, and optical port 325 are connected to the hybrid cable 110, using impedance measurements for the electrical ports 320, 322 or return loss measurements from sensors for the optical port 325 to verify these mechanical connections.

At 728, a determination is made as to whether the hybrid cable 110 is connected to the local electrical ports 320, 322, and optical port 325. If yes, then the process moves on to step 736.

At 736, the MCU 450T in the power transmitter 300 controls the OSA 600T to command any power receiver 500 connected to the hybrid cable 110 to reply with its ID and self-diagnostic results. The power receivers 500 then communicate back a response using their respective OSA 600R. A pseudorandom delay in its response could be applied to minimize message collisions. At 738, if no power receiver replies, this is another instance where the initialization process will have failed (at 760).

At 760, after the MCU 450T verifies that the hybrid cable 110 connected to the local ports of the power transmitter 300, the SELV 310 is disengaged by opening the switch SoTT 311, thus indicating the initialization process has failed (at 760). If the hybrid cable 110 is detected, the auxiliary power supply 410R of all connected power receivers 500, will energize their respective MCU 450R which runs an initial self-diagnostic and opens the switch 519.

In 740, if at least one power receiver 500 replies, the MCU 450T on the power transmitter 300 side stores and ID checks the self-diagnostic results from the reporting power receiver 500.

At 742, if the self-diagnostic of any power receiver 500 shows a failed status, the initialization process will fail (at 760). After the self-diagnostic of all the power receivers 500 passes, the "Test-the-tester" procedure which validates the hardware/software integrity of the system (all receiver IDs), is initiated at step 746. Steps 744, 748 750, 752, and 752 represent the loop iterations required for the multipoint configuration (Nr>1).

The "Test-the-Tester" Procedure at Step 746 is Described as Follows:

The power transmitter 300 commands the power receiver 500 with a specific target ID to introduce the calibrated reference load 520. All other power receivers 500 with different IDs do not respond to this command.

The data output of current sensing circuits 415T/415R on both the power transmitter 300 and power receiver 500 sides, which monitor the feeding current through the hybrid cable 110, is sampled, digitalized, and analyzed in real-time by the MCUs 450T and 450R on both the power transmitter 300 and power receiver 500 sides.

At each measured cycle, the MCU 450R of the power receiver 500 encodes the real-time analyzed data and sends it to the OSA 600R which modulates and transmits it over the optical link of the hybrid cable 110 to the power transmitter 300.

The OSA 600T of the power transmitter 300 demodulates the data and sends it to the MCU 450T of the power transmitter 300 for decoding.

The MCU 450T of the power transmitter 300 analyzes the current sensing data in addition to other system metrics from both sides to verify that the system integrity, validity, and safety are all met. It also verifies the fault detection status of the hybrid cable 110 against any impedance (i.e., touch fault) hanging on the line before enabling the high voltage.

Additional tests at the power transmitter 300, including verification that the difference between analyzed currents from the redundant loads in 415T (TXIH and TXIL) meets required tolerances. In some variants of the embodiment, when the power receiver 500 sends data of both of its loads 415R, the power receiver 500 will also verify whether the difference between analyzed currents from the redundant loads in 415R (RXIH and RXIL) meets the required tolerances. Any detected failure to meet the tolerance will trigger a failure flag and the C4P DC system 100 shows a failed status and the initialization fails (at 760). Note that the power transmitter 300 can determine if the failure is from one of the power receivers 500 or from its own circuits within the power transmitter 300.

Either the power transmitter 300 and/or the power receiver 500 may also introduce an internal impedance to emulate fault conditions (i.e., touch or short circuit) and validate the C4P DC system 100 during the initialization process state.

The system verification process continues over a predefined time period. Once verified, the power transmitter 300 may command the power receiver 500 to disable the reference load 520 and open the switch 519 on the power receiver 500 side under test (ID=i, as shown in FIG. 2) and wait until an acknowledgment over the communication link is received to confirms the disconnection of the switch 519 and the reference load 520.

At 748, if the power receiver 500 under evaluation fails, the test-the-tester procedure fails (failure state in step 760).

At 748, if the power receiver 500 under evaluation passes, the next receiver (from the list of receivers 500, each with a unique ID) is tested using the described procedure above at 746.

At 752, after successfully testing all power receivers 500, the power transmitter 300 commands all the power receivers 500 to close their respective switch 519, to connect their respective load 505, and wait until acknowledgments are received to confirm the disconnection. If Nr=1, the power transmitter disengages the SELV 310, closes switches 307, and starts the operation and monitoring process at 770.

If Nr>1, at step 754 the C4P DC system 100 verifies that when all the reference loads 520 of all the power receivers 500 are connected, the difference between the sum of the currents from all the power receivers 500, and the current measured at the power transmitter 300 is below a specified tolerance. If that condition is met, the C4P DC system 100 starts the operation and monitoring process at 770, as described below:

Operation and Monitoring Process 770:

During operation, the data output of current sensing circuits 415T/415R on both the power transmitter 300 and power receiver 500 sides, which monitor the feeding current through the hybrid cable 110, are sampled, digitalized, and analyzed in real-time by the MCUs 450T and 450R on both the power transmitter 300 and power receiver 500 sides.

Periodically, the power transmitter 300 commands the power receiver 500 with a specific target ID and with a broadcast flag off, to send its analyzed data. The MCU 450R on the power receiver 500 encodes the real-time analyzed data and sends it to the OSA 600R which modulates and transmits it over the optical link of hybrid cable 110 to the power transmitter 300.

The OSA 600T of the power transmitter 300 demodulates the data and sends it to the MCU 450T for further decoding and analysis.

The MCU 450T on the power transmitter 300 side analyzes the current sensing data, and other system metrics from both sides of the link to verify that the system integrity, validity, and safety are all met. It also verifies the fault status of the hybrid cable 110 against any impedance (i.e., touch fault) hanging on the line before enabling the high voltage.

Additional tests at the power transmitter 300, including verification that the difference between analyzed currents from the redundant loads in 415T (TXIH and TXIL) is below the required tolerance. In some variants of the embodiment, when the power receiver 500 sends data of both of its loads 415R, the power receiver 500 also verifies that the difference between analyzed currents from the redundant loads in 415R (RXIH and RXIL) is within required tolerances.

Either the power transmitter 300 and/or the power receiver 500 may also introduce an internal impedance to emulate fault conditions (i.e., touch or short circuit) and validate the C4P DC system 100 during operation. For example, at some specific time, the power transmitter 300 commands the power receiver 500 with a specific target ID to introduce the calibrated reference load 520.

Any failure to meet the tolerances between the current measured at the transmitter 300 and the sum of currents measured at the power receivers 500 triggers a failure flag and the C4P DC system 100 shows a failed status.

The failed status requires the power transmitter 300 to open its switches 307, engage its SELV 310, and broadcast a message to all power receivers 500 to open switch 519 which will disengage their respective load 505.

After a pause period, the C4P DC system 100 will initiate the start of the fault recovery process back at 720.

The description for the processes and steps included in the flow diagram 200 are provided for exemplary purposes. According to other embodiments within the scope of the C4P DC system 100 described herein, the processes described by the flow diagram 200 may include additional, or fewer, steps than those specifically described. The order of the steps may be rearranged as well to achieve the same, or similar, results while still staying within the scope of the C4P DC system 100 described herein.

Figure 3:
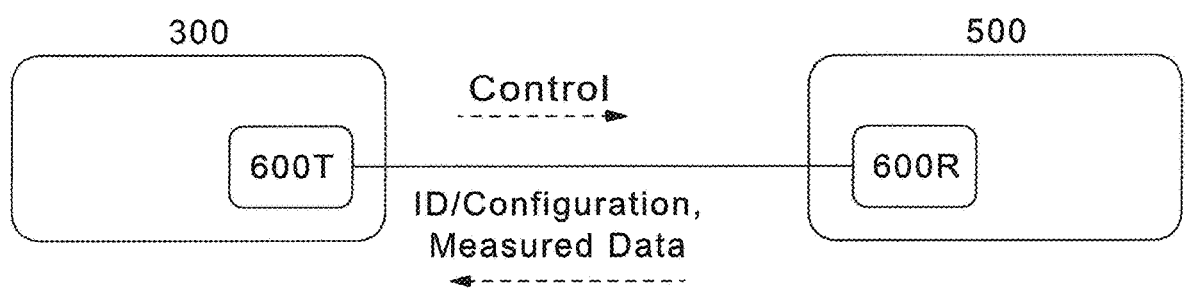
FIG. 3 is an exemplary block diagram representing communication links between a transmitter and receiver in the class 4 power DC system, according to some embodiments.

The following section describes the OSAs 600T and 600R included in the power transmitter 300 and the power receiver 500, respectively. The OSAs 600T and 600R provide optical communication between the power transmitter 300 and the power receivers 500. The OSA's main functions are to modulate and demodulate electrical signals to convert them from the electrical to the optical domain and vice versa from the optical to electrical domain, and to couple the optical signal to the optical fiber of the hybrid cable 110. From the previous description of the flow diagram 200 shown in FIG. 2, the communication between the power transmitter 300 and the power receiver 500 may not be symmetrical. The messages from the power transmitter 300 are commands transmitted to the power receiver 500, where the commands are instructions for the power receiver 500 to perform functions such as changing a configuration, sending a configuration status, or starting an initialization or operation. The messages from the power receiver 500 are mainly responses to requests for such information from the power transmitter 300 and the data that represents measured current and/or voltages, as represented by the communication links included in the block diagram shown in FIG. 3.

The OSAs 600T and 600R include at least one optical source, an LED or laser, modulator, and driver circuits, photoreceivers, amplifiers, and optical coupling elements to enable the optical signal propagation from the optical source to a fiber, and from the fiber to a photoreceiver.

The amount of information shared between the OSAs 600T and 600R requires data rates below 100 Mbps, which are considered very low data rates for state-of-the-art transceivers capable of data rates of 100 Gbps per wavelength over MMF or SMF.

Therefore, even for long distances, the communication between the power transmitter 300 and the power receiver 500 may be performed using the simplest and least expensive modulation scheme such as direct modulation ("DM") of the laser (or LED), and intensity detection at the photodetector. On-off-keying ("OOK") is the simplest DM/ID scheme where the transmitted symbols represent zeros or ones.

Due to the relatively low data rates used in the communication system, the detrimental effect of noise and dispersion are highly reduced resulting in large power budgets that can be used to split signals as needed for the multipoint topology. As an illustrative example, a system using low-power lasers, with −6 dBm launch power with connectivity losses of 2 dB, attenuation of 1 dB/km, and receiver sensitivity of 25 dBm (for bit error rates lower than 1e-12) results in power budgets of 15 dB for 2 km or 7 dB for 10 km.

C4P communication channels in the C4P DC system 100 may be implemented in multi-mode fiber ("MMF") or single-mode fiber ("SMF"). However, for exemplary purposes, this disclosure will describe the use of SMF, which is a type of fiber commonly used for applications such as Ethernet or passive optical network, PON or passive optical LAN, and POL over distances longer than 100 m. In those applications, the laser's wavelengths are typically in the spectral range of 1270 nm-1330 nm or 1530 nm-1570 nm. In some cases, those optical networks require online monitoring provided by optical time domain reflectometers, OTDRs, operating in the range of 1620 nm-1650 nm.

Since one of the objectives of the C4P DC system 100 is to share the fiber optical spectrum with other applications, the C4P DC system 100 targets optical spectral regions not used by Ethernet or commonly deployed PONs. For example, the optical E-Band, ranging from about 1370 nm to 1450 nm, is less commonly utilized due to high water absorption of legacy SMF. Today's fibers have a negligible water peak; therefore, this range of wavelength is available with low expensive coarse wavelength division multiplexing CWDM lasers.

Alternatively, the low data rates of C4P signals allow using of the short-band 830 nm-980 nm (SWDM-band) in SMF regardless that at those wavelengths the fiber behaves as multimode fiber and has modal dispersion.

FIG. 4A shows a block diagram of one exemplary OSA 600Ta that may be included in the power transmitter 300, according to some embodiments. The port 601a of the OSA 600Ta receives electrical control signals data from the MCU 450T, which may already be encoded in frames. Alternatively, the encoding (and decoding) of the frames may be performed by a custom-designed communication physical layer device (PHY) 605, or an off-the-shelf PHY such as Ethernet or Profinet.

The MCU 450T or PHY 605 encodes/decodes the data frames at a specific modulation speed and frame structure. An electrical switch 635 sends frames from 605 to one of two redundant driver and optical source modules 640a and 640b. The optical source of each module 640a and 640b, operates at center wavelengths, $\lambda 1a$ and $\lambda 1b$ which satisfy the criteria, abs($\lambda 1a$-$\lambda 1b$) 20 nm. The redundant optical sources on the path which is not selected by the switch 635 can be turned off. An optical 50%/50% splitter/combiner 670 is used to couple the output of both optical sources to one fiber. It should be noted that although both optical sources, e.g., lasers in modules 640a and 640b can be biased (turned on), only one of them will be sending the data. The optical signal from the combiner is sent to an optical filter 680 that couples the outgoing signal to the optical fiber of the hybrid cable 110.

Therefore, signals from the power transmitter 300 are sent to the power receiver 500 using wavelengths $\lambda 1a$ or $\lambda 1b$. Since available optical sources can have failure in time, FIT better than 50, a '1+1' redundancy on the lasers (and photodetectors) provided by the OSA can significantly improve the reliability of the C4P fault detection provided in the present C4P DC system 100. The device 680 also directs incoming signals at wavelengths $\lambda 2a$ or $\lambda 2b$ to the 50%/50% splitter/combiner 670 which sends the light to the photoreceiver and amplifier modules 650a and 650b. Note that only one wavelength, $\lambda 2a$ or $\lambda 2b$, will be carrying the data from the power receiver 500. The switch 635 selects the electrical output from modules 650a or 650b and sends it to the PHY 605 for frame decoding.

FIG. 4B shows a block diagram of an exemplary OSA 600Ra that may be included in the power receiver 500, according to some embodiments. Note that the OSAs 600Ta and 600Ra are similar, but the transmitted and received wavelengths in each one are switched to facilitate the separation of incoming and outgoing signals by filter 680.

The OSA 600Ta and 600Ra may use low-cost and low-power consumption devices such as the 10BASE-FX (10 Mbps) Ethernet PHY 605 which exceeds the requirements of disclosed C4P data rates (e.g., ~128 Kbps) making frame collisions in a multipoint topology negligible. However, even for this PHY 605, most of the smallest Ethernet frame bytes (46 Byte payload) will likely be unused, without fully profiting from either the fiber bandwidth advantages or PHY chip capabilities. Alternative OSA embodiments are illustrated in FIGS. 5 and 7-8 that are designed to address these issues.

FIG. 5A shows a second exemplary embodiment of an OSA 600Tb that may be included in the power transmitter 300, and FIG. 5B shows a second exemplary embodiment of an OSA 600Rb that may be included in the power receiver 500. In these OSAs 600Tb and 600Rb, the PHY 605 is removed and the encoding/decoding of simpler frames, e.g., the frame shown in FIG. 6A is performed by the MCU 450T or 450R included in the power transmitter 300 or power receiver 500, respectively. Note that the required frames are significantly smaller than the ones used in the Ethernet shown in FIG. 8B due to the low traffic required and the specificity of the application. Different from the first embodiments of the OSA (e.g., OSA 600Ta and 600Ra), the second embodiment of the OSA (e.g., OSA 600Tb and 600Rb) include an Intermediate Frequency (IF) modulation/demodulation scheme to separate current measured on loads RXIH and RXIL at the power receiver 500.

FIG. 5B shows the OSA 600Rb included in the power receiver 500, where one input of the frequency modulators 626 are frames from the MCU 450R using ports 601Hb and 601Lb (e.g., frames shown in FIG. 6B), where the frame payloads carry the digitalized value of the currents in RXIH or RXIL. Alternatively, the bits of the frame represent a function of both values, e.g., average, or differences. The frequency modulator 626 use the modulation frequencies 610H and 610L, each in the range of 100 kHz to several MHzs, spectrally separated to avoid crosstalk. For multipoint topologies, the frequencies 610H and 610L can be tuned, or assigned by the power transmitter 300, to provide simultaneous communication from the power transmitter to several power receivers 500 with negligible crosstalk. Note that the frequency modulator 626 (and also the modulator 625) include low pass filters on the input side and pass band filters at the output tuned to the used IF spectrum. The resultant IF signals are electrically combined by a combiner 630, and from there follow a similar process previously described for the first embodiment OSA 600Ra.

At the OSA 600Tb of the power transmitter 300, the optical signals are converted to electrical ones as previously described for OSAs 600Ta. After the switch 635, the IF signals are demodulated by the modulator 625 producing baseband signals, the recovery frames from the power receiver 500.

The OSAs 600Tb and/or 600Rb may be further simplified. For example, the electrical combiners/splitters 630 may be removed from the OSA 600Tb and/or OSA 600Rb, as shown in the third exemplary embodiment of an OSA (e.g., OSA 600Tc and OSA 600Rc) shown in FIGS. 7A and 7B. In this third embodiment, the data from 415H and 415L is transmitted using two different optical wavelengths. For point-to-point topologies, the IF modulators 625 and 626 are disabled since signals from 415H and 415L are transmitted by different wavelengths. However, for multipoint topologies, the OSAs 600c employ the IF modulators 625 and 626 to separate 415H and 415L channels. Since the IF modulators 625 and 626 can use different electrical frequencies, all power receivers to use o use the same sets of wavelengths $\lambda 2a$ and $\lambda 2b$.

The optical communication link can make C4P useful for a broad range of future applications requiring power and high bandwidth. However, for some applications that require further simplification of complexity and/or cost, an asymmetric system, where the power transmitter 300 is responsible not only for the fault-safety protocols but also controls the ADC process of the power receiver is provided according to embodiments of the C4P DC system 100.

Figure 8B:
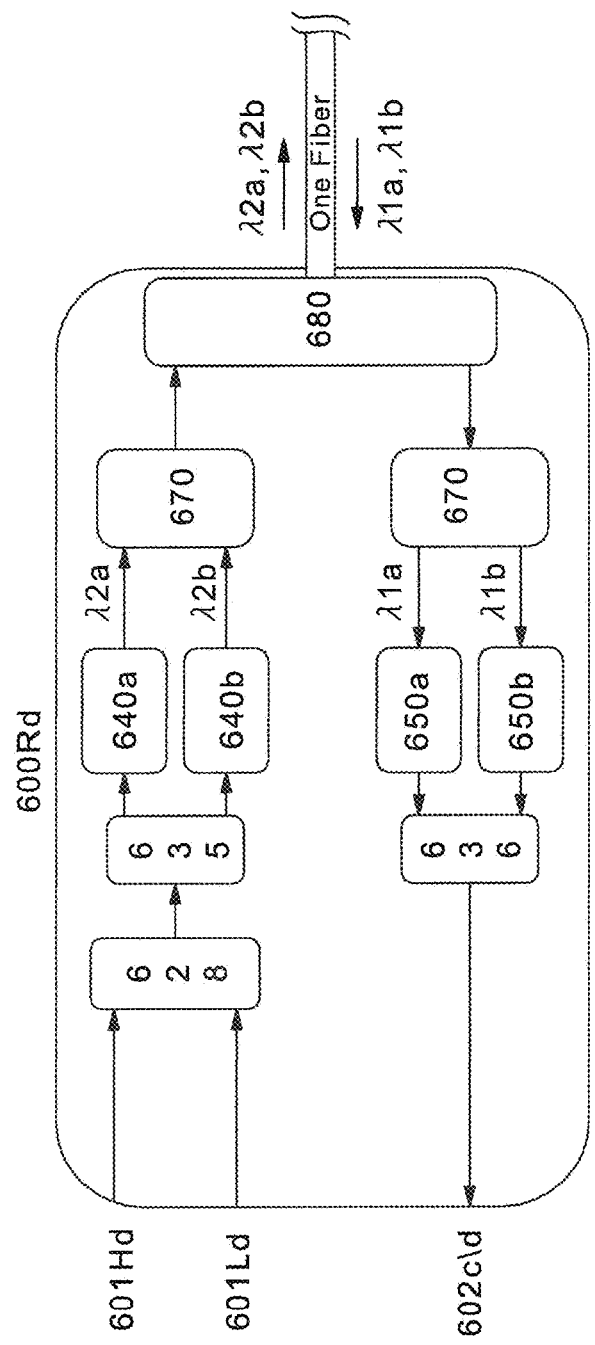
FIG. 8B is a block diagram illustrating a power receiver included in the class 4 power DC system, according to the fourth embodiment.
Figure 8A:
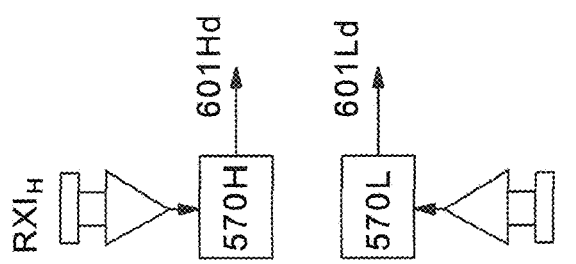
FIG. 8A is a block diagram illustrating a simplified configuration of a power receiver included in the class 4 power DC system, according to a fourth embodiment.

FIG. 8A shows a block diagram representing a minimalist configuration of the power receiver 500, where the power receiver 500 requires to have each of the analog signals from sensing loads of RXIH and RXIL connected to respective voltage control oscillators ("VCOs") 570 which converts voltage to pulsed signals whose width is proportional to the input voltage. For example, FIG. 9A shows sinusoidal input signal 805 that is encoded into the sequence 810 by a VCO 570. That sequence 810 can be posteriorly decoded using rising (or falling) edge detectors and counter circuits as shown in FIG. 9B where output signal 820 is the output of an edge detector (pulses of similar width but at different temporal positions) and signal 825 is the normalized signal from a counter circuit.

The proposed method simplifies the power receiver by separating the A/D conversion into two steps: the voltage to pulse width modulation that drives directly the optical source of the power receivers (VCOs 570 output connected to ports 601H and 601L as shown in FIGS. 8A and 8B), and the final digitalization at the power transmitter 300 side.

Note that due to the required bandwidth of this conversion process, this method only can be efficiently applied to optical communication systems, where there is plenty of bandwidth and the optical binary signals are less affected by noise. On the other hand, transmitting the encoded signals 810 as baseband signals at several tens or hundreds of Mbps, could be problematic over power lines not designed for communication.

In FIG. 8B, a switch 628 in OSA 600Rd is used to temporally multiplex signals from RXIH and RXIL, eliminating the need for mixers (e.g., the modulators 625 or 626 included in OSA 600Tb or 600Rb) or the use of additional wavelengths. The switch 628 produces a temporal gap, ΔT, between the RXIH and RXIL to temporal multiplex the data, facilitating detection. FIG. 10A also shows the corresponding OSA 600Td at the power transmitter 300, using a similar switch, 628, to demultiplex the signals.

This scheme simplifies OSA hardware and functions of power receivers 500 since most of the A/D conversion and analysis is produced at the power transmitter. In addition, the power receivers 500 do not need to execute overburden communication protocols which required the generation of preambles, aligning markers, and CRCs, among other functions.

Figure 11:
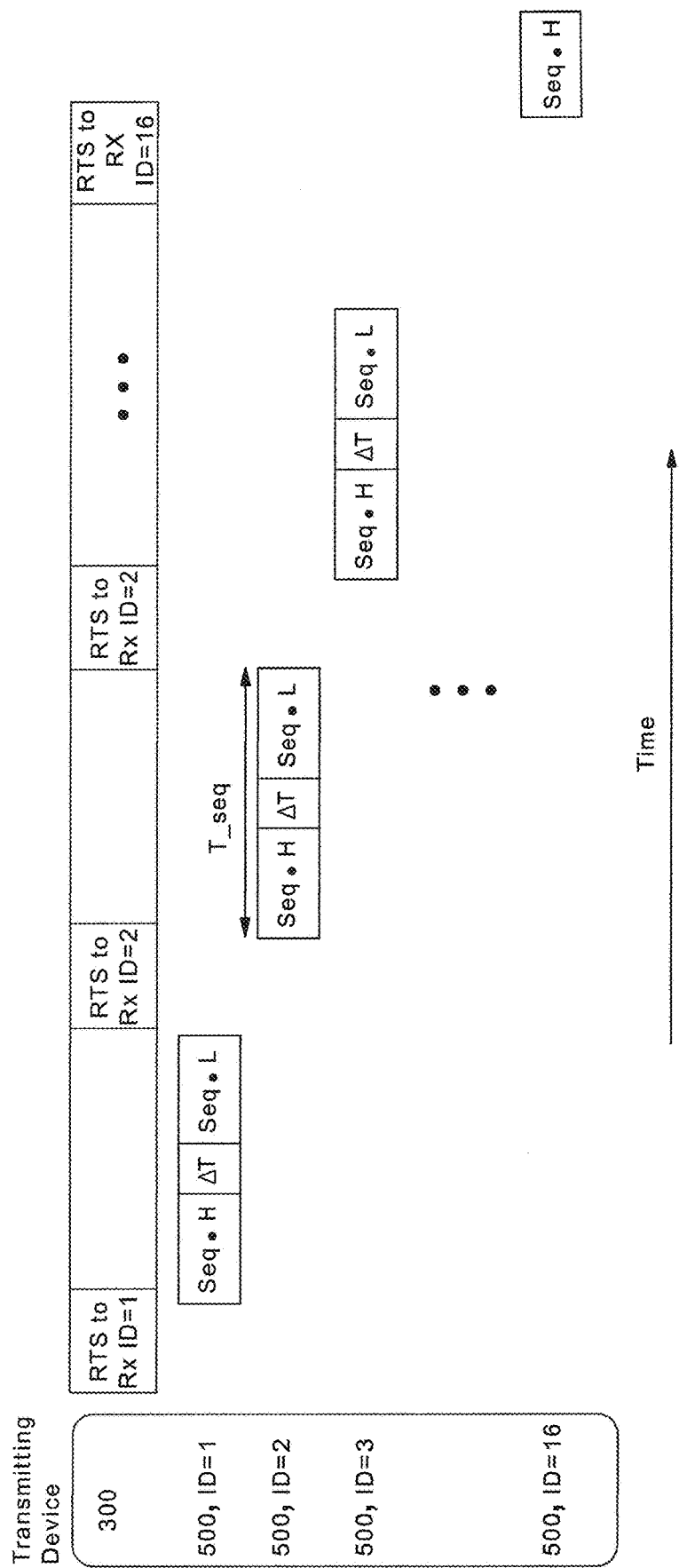
FIG. 11 is graphical view of a communication scheme for transmitting data to sixteen power receivers included in the class 4 power DC system, according to the fourth embodiment.

FIGS. 10A and 10B show a block diagram of exemplary OSAs according to a fourth embodiment, e.g., power transmitter side OSA 600Td and power receiver side OSA 600Rd. FIG. 11 shows an exemplary communication scheme using OSAs according to the fourth embodiment. In this example, a power transmitter 300 may control and communicate with sixteen (16) power receivers 500. The power transmitter 300 periodically sends requests, using $\lambda 1a$ or $\lambda 1b$, using a specific target power receiver ID to transmit their data. The power receiver 500 with the matching ID sends its RXIH and RXIL sequences using the active wavelength, $\lambda 2a$ or $\lambda 2b$, and inserts a temporal gap between them. The power transmitter 300 decodes the information and executes the safety protocol described previously (see e.g., FIG. 2), and sends a request to the next power receiver.

Network Applications and Supporting Optical Infrastructure

Figure 12:
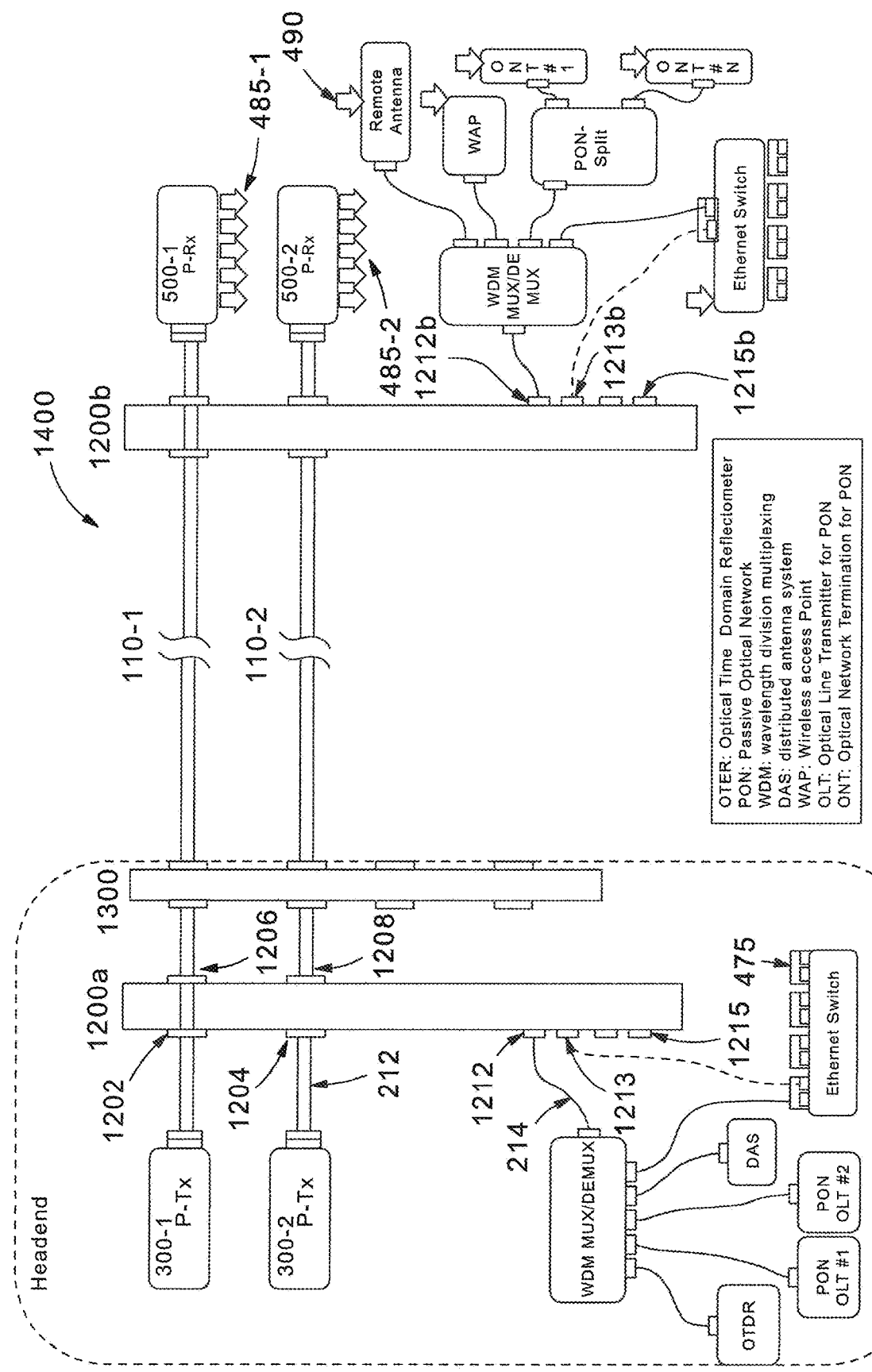
FIG. 12 is a block diagram showing an exemplary utilization of the class 4 DC power DC system in an optical communication system, according to some embodiments.

The disclosed power transmitter and power receiver embodiments and the fault-managed power methods can serve diverse applications requiring high bandwidth over long distances, over hybrid connectivity as exemplified by the system 1400 shown in FIG. 12, where the system 1400 may share some, or all, of the components included in the C4P DC system 100 described herein. The disclosed fault-managed power system verifies the conditions of the system in real-time, therefore it is capable of transmitting high voltage DC or pulsed power. In the latter case, different from conventional pulsed power systems, that sense power when the high power pulsed is off, the power can be sensed during the periods when the high power pulses are on.

In the exemplary system 1400, two transmitters 300-1 and 300-2, located in an equipment room, energize remote power receivers 500-1 and 500-2 using hybrid modules 1200a and 1200b, hybrid patch panel 1300, and hybrid cables, 200-1 and 200-2.

The power transmitters, 300-1 and 300-2 connect to modules 1200a using hybrid patch cords 212. The hybrid module 1200a connects to hybrid patch panel 1300, enabling flexible configuration of power and data connections. The hybrid ports, 1300 and 1200 (ports, 1202 and 1204) may be off-the-shelf known hybrid connectors such as IP-16 from Senko, Harting hybrid connectors, or others developed for class 4 fault managed power. Alternatively, 1300 and 1200 can have separated ports for the electrical cables, such as a Phoenix-type connector, and LC, SC, or SN for the optical connectors.

Hybrid modules 1200, also have simplex, duplex, or multifiber optical ports, 1212-1215 implemented with LC, SC, SN, MPO, or another type of optical connector. Here, for the sake of simplicity, we assume that the 1212 ports are simplex (one fiber) that operates bidirectionally.

The example shows several network devices in the equipment room such as Ethernet switches, distributed antenna systems, DAS, different PON's OLTs, and OTDRs that share the same hybrid cables 110-1 and 110-2 to connect to remote devices, such as switches, wireless access points, WAPs, PON's ONTs, and antennas. As shown in the exemplary system 1400, an external WDM multiplexer/demux located in the equipment room combines the diverse applications and at the remote locations, a similar WDM device distributes the signals to different receivers.

On both sides of the network, the WDM multiplexer/demultiplexers, connect to port 1212 using patch cord 214 (one fiber patch cord). Note that Ethernet switches traditionally use duplex optical ports, 475, therefore an additional fiber connection is used from one of the Ethernet switch ports to port 1213 of the modules 1200s (dotted lines).

Over this infrastructure, the power receiver 500 connects to the power transmitter 300 to perform the previously described initialization and operation procedures for fault-managed power. During operation, the power receivers 500 deliver power to the end devices using external electrical ports 485 that connect to device power inputs 490. The ports 485 of power receivers 500-1 and 500-2 can operate independently feeding each one different network devices or can work together to combine the power of their outputs. Alternatively, one power receiver, e.g., 500-1 can deliver power to all devices and 500-2 be on standby to provide backup power electrical when needed.

Figure 13:
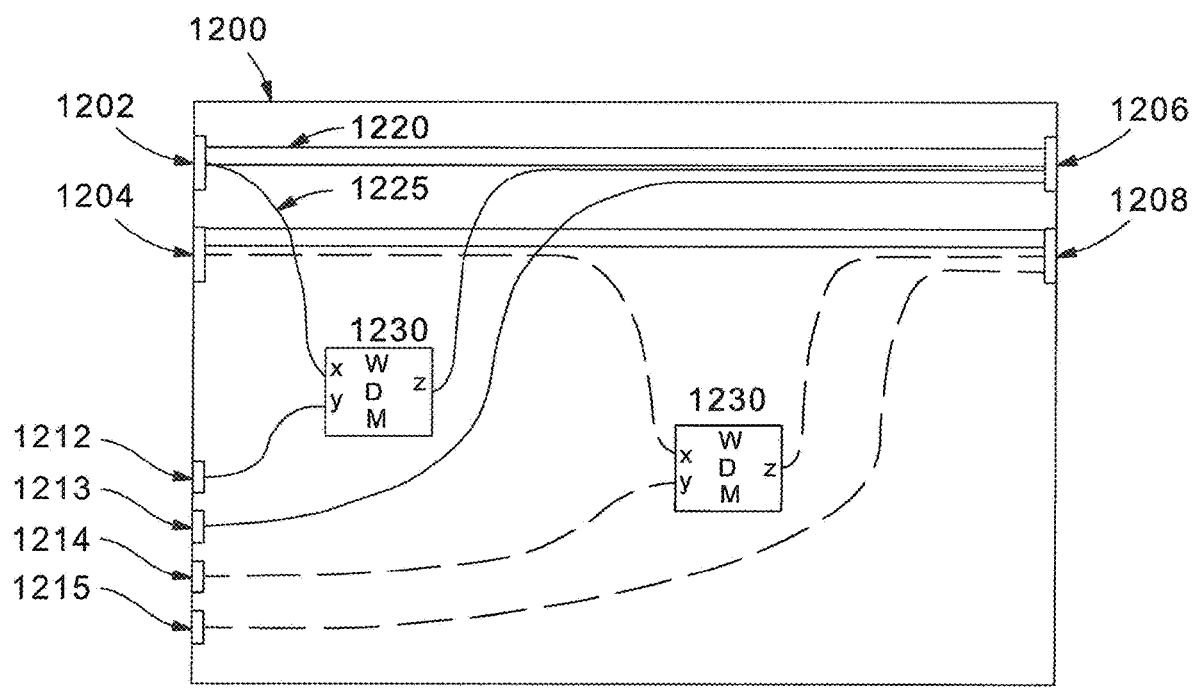
FIG. 13 is a block diagram showing an exemplary hybrid module used in the class 4 power DC system, according to some embodiments.

FIG. 13 shows the internal configuration of a hybrid module 1200, and how it combines the data signal from ports 1212 to 1215 (the applications) with signals from 1202 and 1204, (the monitoring and control signals of 300 and 500). Inside 1200 the power lines, 1220, and fiber 1225 from port 1202 are separated and the fiber is connected to a port (port x) of WDM Mux/Demux, 1230. This port only can transmit and receive, wavelengths $\lambda 1a$, $\lambda 1b$, $\lambda 2a$, or $\lambda 2b$ used for the control and monitor signals as previously described. The application signals from ports 1212 and 1213 connect to port y of the same WDM 1230, which is transparent to any wavelength except $\lambda 1a$, $\lambda 1b$, $\lambda 2a$, or $\lambda 2b$. The WDM 1230 output z, which combines/splits the signals from ports x, and y, connects to port 1206. Similarly, from the second hybrid port 1204, the fiber (dashed lines) the fibers are combined with signals from 1214 and 1215 using a second WDM 1230, which directs signals 1208.

Hybrid modules 1200 can be implemented in diverse form factors, enabling flexible connections using different types of hybrid cables. The modules shown in FIGS. 12 and 13 could provide "1+1" redundancy where the system can be recovered from failures of one power transmitter 300, one receiver 500, or one hybrid cable 110.

Figure 14A:
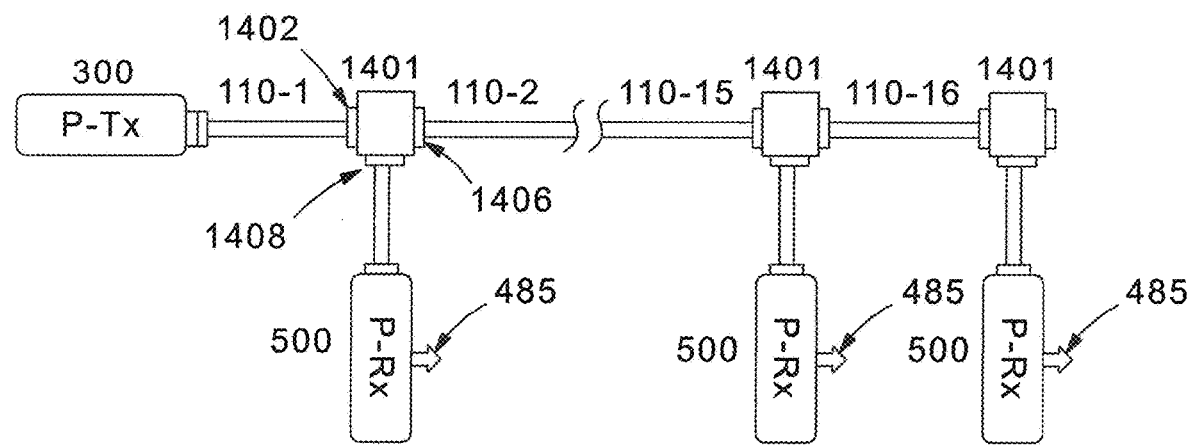
FIG. 14A illustrates an exemplary multipoint topology system diagram where a power transmitter is transmitting to a plurality of power receivers, according to some embodiments.

An example of multipoint topologies is shown in FIG. 14A where, one or more power transmitters 300, deliver power to several power receivers 500, using hybrid couplers/splitters 1401, and several hybrid cables 110.

In this topology, using the hybrid couplers/splitters 1401, the communication of data and control signals between power transmitter 300 and power receivers 500 uses the set of wavelengths ($\lambda 1a$, $\lambda 1b$, $\lambda 2a$, or $\lambda 2b$) over one fiber of the concatenated hybrid cable segments 110-1 to 110-16. Over this multipoint network, comprising the segments of the hybrid cable 110, with at least two or electrical conductors and one fiber, and the hybrid couplers/splitters 1400, the power transmitter 300, connects to the power receiver 500 to perform the previously described fault-managed power procedures for initialization and operation.

Figure 14B:
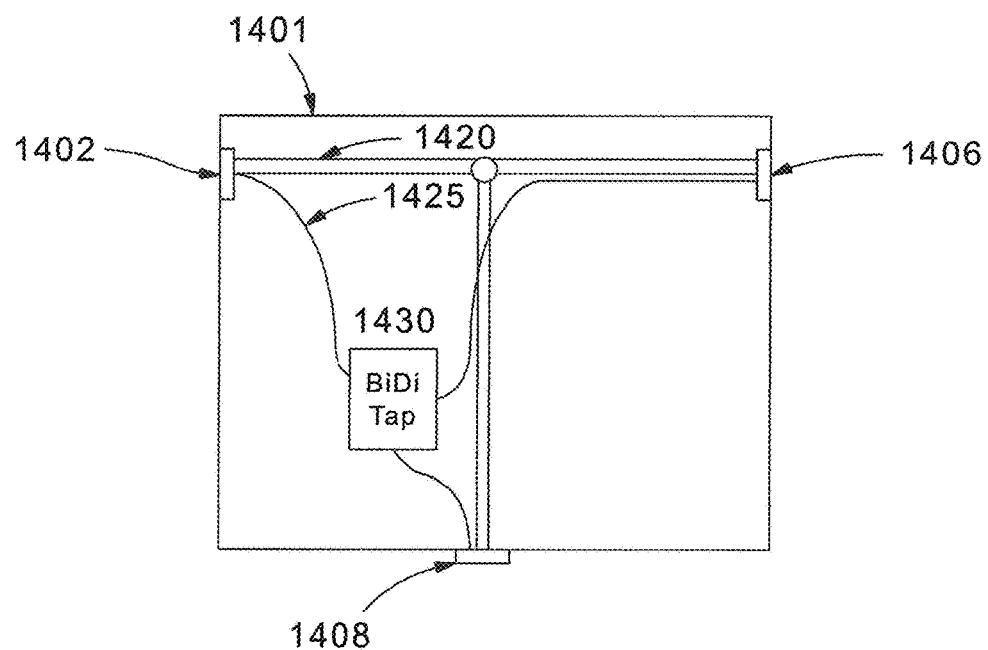
FIG. 14B is an internal view of an exemplary hybrid coupler used in the multipoint topology system shown in FIG. 14A, according to some embodiments.

FIG. 14B shows the internal configuration of the hybrid coupler/splitters 1401. In those devices, the fiber from hybrid port 1402 is connected to a WDM optical tap 1430 that for the set of wavelengths ($\lambda 1a$, $\lambda 1b$, $\lambda 2a$, or $\lambda 2b$) transmits most of the optical power to port 1406 and couples a small part of the signal from ports 1402 to port 1408. For any other wavelengths, the ones used for Ethernet, PON, or other applications, the WDM optical tap 1430 ideally transmits all the power from port 1402 to port 1406.

Response Time and On-the-Fly Verification Methods with Switched Reference Load

Figure 15A:
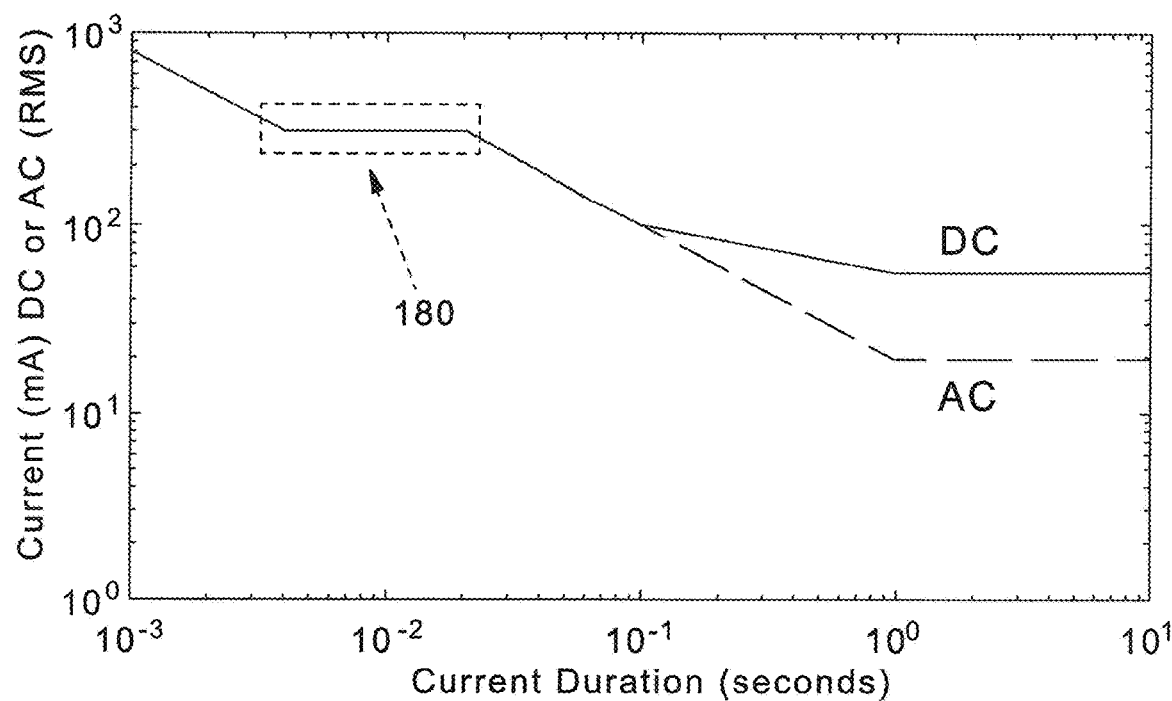
FIG. 15A is a graph plotting maximum current exposure times against different current values within the requirements of class 4 power, according to some embodiments.
Figure 15B:
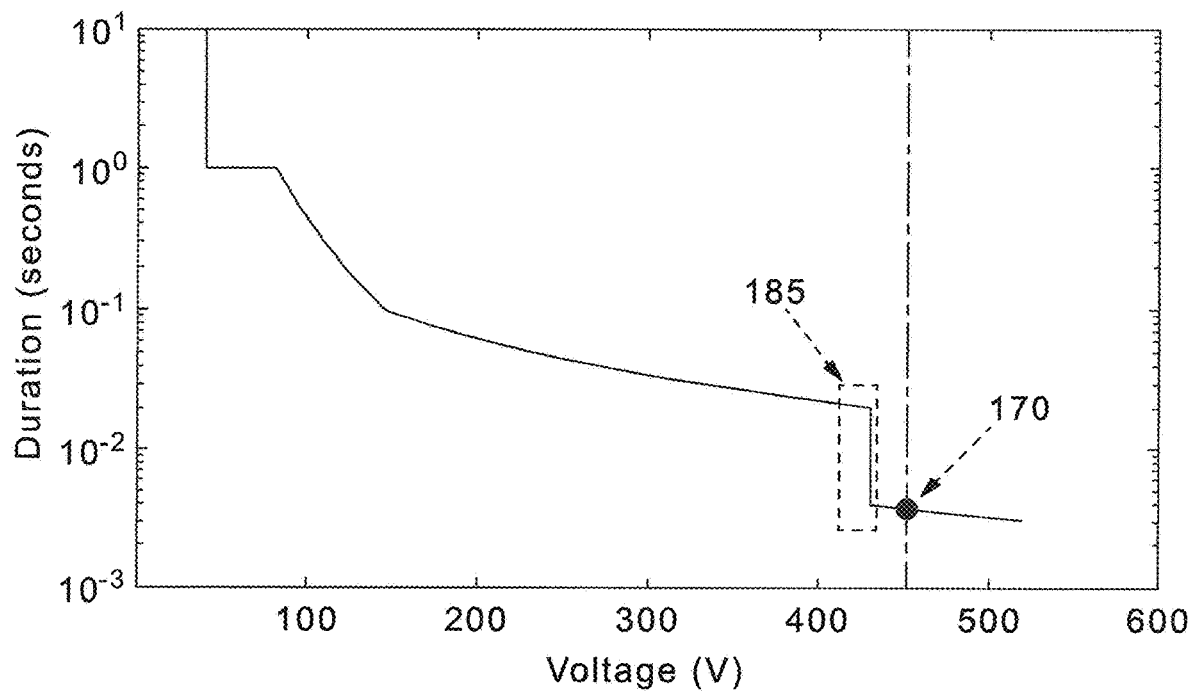
FIG. 15B is a graph plotting voltage values against different exposure times within the requirements of class 4 power, according to some embodiments.

For a fault management power system, and in particular class 4 power, the response time consisting of the time necessary to detect and react to a potential fault by disengaging the transmitting power, is required to be within preset values. In other words, the response time is required to be shorter than a maximum safe exposure time for a given current, as described earlier. Due to numerous safety criteria employed for the estimation of the effects of shock current on humans, the maximum exposure to currents described in UL 1400-1, and shown in FIG. 15A, can be measured according to a set of piecewise curves (and limiting equations). As it can be seen in section 180 of the maximum exposure time vs. body current graph shown in FIG. 15A, the exposure times in the range from 4 milliseconds to 20 milliseconds, corresponding to a known or predicted critical range of heartbeat, are limited to a maximum current of 300 mA. Using an assumed body impedance of 575 ohms, the time to voltage graph shown in FIG. 15B shows that for a maximum voltage for a given exposure, there is a region 185, where a sharp transition occurs. For example, at a slightly value higher than 431 V, the maximum exposure is 4 ms whereas at values equal to or lower than ~431 V the maximum exposure time can increase up to 20.9 ms.

The longer the exposure time the more relaxed the operation and the hardware speed of the fault-detection system. Therefore, at least two operation modes can be used in the disclosure, one with up to voltages of 430V, with maximum exposure times of ~20 ms, which could be used to allow multipoint topologies for a large number of users, and another with 450V with maximum exposure times below 4 ms, being the latter is capable of transmitting 10% more power.

In both operational cases, the degree of safety of the described fault-detection system depends on the uncertainty or reliable predictability levels provided by the sensors and ADC. In previous sections, we described the apparatus and methods for sensing and digitalization. Those methods are susceptible to errors if unexpected changes or damages in the load, 415R amplifier, or digitizer (e.g., ADC 420R) occur. In this disclosure, we proposed the use of one or more switched reference loads 520, for calibration or verification of the system.

During operation, the switched reference load 520 is switched on and off, at specific time intervals, e.g., a verification period, Tv, producing a slight modification of current in the system, $\Delta I$, w due to the change of the load impedance given by $$\frac{Rref \cdot R_L}{(R_L + Rref)},$$

where Rref is the impedance of the switched reference load, 520, and $R_L$ the load 505 of the power receiver. During the operation, if the same amount of currents variation $\Delta I$ is measured by all the sensors, (within defined tolerances), the sensing and digitalization hardware of power receiver 500 passes the verification. Note that this occurs while the power transmitter is delivering the power, since by using a high impedance of Rref, e.g., 20000 Ohms, a very small variation in the amount of power delivery can be achieved. If the verification test does not pass, the power transmitter should start the fault recovery procedure described by the flow diagram 200 illustrated in FIG. 2.

Using one or more switched reference loads 520 can improve the accuracy of the verification and capture more information about the system at the cost of adding complexity to the receiver.

Figure 16:
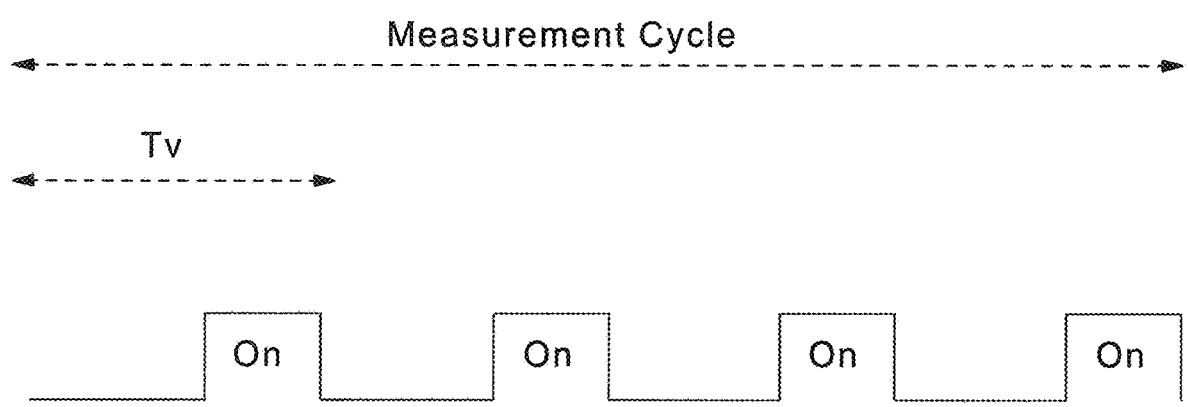
FIG. 16 is an exemplary cycle graph showing how an on-the-fly verification may be implemented by the class 4 power DC system, according to some embodiments.

FIG. 16 illustrates an exemplary cycle graph of how on-the-fly verification can be implemented by the C4P DC system 100. In this example, the power transmitter 300 commands the power receiver 500 to switch on and off the reference load 520 periodically, performing several verifications of duration Tv during one measuring cycle. In other implementations not shown in the figure, the power transmitter 300 can request non-periodical changes of the reference load, or also extend the verification period to make it longer than the measurement cycle.

A fault-management power system for pulsed or DC electrical power transmission is disclosed, the fault-management power system using optical fiber links to communicate between power transmitter and power receivers, where optical signals transmit control and monitoring data to/from the mentioned power transmitter and power receivers, wherein the optical fibers utilized are made of glass or plastic, wherein the optical fibers operate in multimode or single mode regime, and utilize one or two wavelengths to transmit and receive the information, wherein, both the system are designed to verify and cover single fault conditions in the safety-critical circuits.

The fault-management power system may be configured to meet requirements for Class 4 power systems and/or comply with UL Standard 1400-1.

The fault-management power system may be configured such that the optical fibers are also used to transmit data from other network devices.

The fault-management power system may be configured such that it allows point-to-point or multipoint topologies for power delivery.

The fault-management power system may be configured such that the accuracy of the system is verified during operation using switched reference impedance.

The fault-management power system may be configured such that free error communication between power transmitters and receivers through optical fiber can be achieved for at least 10 km.

The fault-management power system may be configured such that it enables power transmission of 2 kW.

The fault-management power system may be configured such that the power receivers use a voltage-controlled oscillator to encode the measured electrical parameters and transmit pulse width modulated signals to the power transmitter where the pulse width is converted to digital values.

The fault-management power system may be configured such that it transmits pulsed power, and wherein the fault sensing is performed while the power pulses are transmitted.

A fault-management power management method for a power delivery system is disclose, the method comprising analysis of measurements from at least four redundant circuits that sense and digitalize electrical parameters such as voltage and current, wherein the sensing and digitalization circuits are distributed between the power transmitter and the power receiver, where the power transmitter and power receiver communicate using optical signals over optical fiber, where the differences between electrical parameters measured at the power transmitter side and the power receiver side are verified at intervals below 20 ms, where the power delivery stops when the different measurements of the electrical parameters from each sensor are beyond a specific tolerance limit.

According to the fault-management power management method, the power receivers may use a voltage-controlled oscillator to encode the measure electrical parameters and transmit pulse width modulated signals to the power transmitter where the pulse width is converted to digital values.

According to the fault-management power management method, an analog to digital of the signal measured at the power receivers may be performed at the power transmitter.

According to the fault-management power management method, point-to-point or multipoint topologies for power delivery may be allowed.

According to the fault-management power management method, the accuracy of the system may be verified during operation using switched reference impedance.

According to the fault-management power management method, free error communication between power transmitters and receivers through optical fiber may be achieved for at least 10 km.

According to the fault-management power management method, the power delivery system may enable power transmission of 2 kW.

A fault-management power system for pulsed or DC electrical power transmission over hybrid (optical/electrical) networks is disclosed, wherein the control and monitoring signals of the system utilizes a small portion of the optical spectrum, wherein the optical fibers utilized are made of glass or plastic designed to operate in multimode or single mode regime, wherein the system is designed for bidirectional communication, e.g., using one or two wavelengths to transmit and receive the information, over the same fiber, wherein, both the system is designed to verify and cover single fault conditions in the safety-critical circuits.

According to the fault-management power system for pulsed or DC electrical power transmission over hybrid (optical/electrical) networks, the optical fibers may also be used to transmit data from other network devices.

According to the fault-management power system for pulsed or DC electrical power transmission over hybrid (optical/electrical) networks, the optical fibers may have multiple cores, each one capable of transmitting an optical signal.

According to the fault-management power system for pulsed or DC electrical power transmission over hybrid (optical/electrical) networks, point-to-point or multipoint topologies for power delivery may be allowed.

According to the fault-management power system for pulsed or DC electrical power transmission over hybrid (optical/electrical) networks, the accuracy of the system may be verified during operation using switched reference impedance.

A fiber optic hybrid module for a fault-managed power system is disclosed, the module comprising a main body, a front face, a rear side, a left side, and a right side, wherein: the front face accommodates a multiplicity of hybrid (electrical/optical) connectors, the rear face accommodates a multiplicity of hybrid (electrical/optical) connectors, it comprises internal electrical conductors and fiber, wherein the electrical conductors of the input and output hybrid ports of the module connect to the internal conductors of the module and wherein the optical fiber(s) of the input and output hybrid port connects to the internal optical fiber(s) of the module, the module apparatus contains at least a wavelength division multiplexer/demultiplexer designed to redirect a narrow and commonly unused optical spectral region of the signal propagating in an internal optical fiber, which is utilized by the fault-managed power system, to another internal optical fiber, and the module apparatus contains at least a wavelength division multiplexer/demultiplexer described above used to combine, isolate or split optical signals used by the fault-managed power system from optical signals used by other communication systems.

A fault-management power system using modules of optical wavelength selective couplers, over hybrid optical networks, that utilize a small portion of the optical spectrum is disclosed, wherein the optical signals transmit control and monitoring data to/from the mentioned power transmitter and power receivers, wherein the optical fibers utilized are made of glass or plastic, wherein the optical fibers operate in multimode or single mode regime, and utilize one or two wavelengths to transmit and receive the information, and wherein the system is designed to verify and cover single fault conditions in the safety-critical circuits.

According to the fault-management power system, the optical fibers are also used to transmit data from other network devices.

According to the fault-management power system, point-to-point or multipoint topologies for power delivery may be allowed.

The present disclosure thus describes systems, devices, and methods for implementing a class 4 fault managed DC power system associated with the current approaches described above. As is readily apparent from the foregoing, various non-limiting embodiments of the systems, devices, and methods for implementing a class 4 fault managed DC power system have been described. While various embodiments have been illustrated and described herein, they are exemplary only and it is not intended that these embodiments illustrate and describe all those possible. Instead, the words used herein are words of description rather than limitation, and it is understood that various changes may be made to these embodiments without departing from the spirit and scope of the following claims.

What is claimed is:

1. A power transmitter included in a fault-management power system, the power transmitter comprising:
  a processor; and
  a memory in communication with the processor, the memory including executable instructions that, when executed by the processor, causes the processor to:
    control a power switch to disconnect the power transmitter from a power source during a system initialization mode;
    control a low power switch to connect to a low power source and power an optical subassembly;
    determine a predetermined condition of whether at least one optical fiber port and at least one electrical port is connected to a hybrid cable, and control an optical data interface to transmit a connection request to a power receiver based on the determination;
    receive, by the optical subassembly, a reply to the connection request from the power receiver, the reply being transmitted over an optical fiber included in a hybrid cable;

receive, by the optical subassembly, a diagnostic message from the power receiver, the diagnostic message being transmitted over the optical fiber included in the hybrid cable;
conduct a fault detection test;
determine whether a power transmission condition is met based on at least the diagnostic message and the fault detection test; and
control transmission of high voltage power to the power receiver based on the determination, the high voltage power being transmitted over a conductor wire included in the hybrid cable.

2. The power transmitter of claim 1, the memory further including executable instructions that, when executed by the processor, causes the processor to:
determine the system initialization mode has failed if a reply from the power receiver is not received within a predetermined amount of time.

3. The power transmitter of claim 1, wherein the diagnostic message received from the power receiver includes current sensing data obtained from a current sensing circuit from the power receiver.

4. The power transmitter of claim 1, the memory further including executable instructions that, when executed by the processor, causes the processor to implement a test-the-tester process to:
obtain, from a current sensing circuit included in the power transmitter, current sensing data corresponding to the power transmitter;
obtain current sensing data corresponding to the power receiver from the diagnostic message received from the power receiver;
analyze the current sensing data corresponding to the power transmitter and the current sensing data corresponding to the power receiver; and
determine whether the power transmission condition is met based on at least the fault detection test and the analysis of the current sensing data corresponding to the power transmitter and the current sensing data corresponding to the power receiver.

5. The power transmitter of claim 4, wherein the power transmitter is configured to analyze the current sensing data corresponding to the power transmitter and the current sensing data corresponding to the power receiver to determine a fault detection when a difference between a current sensed in the power transmitter and a current sensed in the power receiver is greater than a predetermined tolerance limit.

6. The power transmitter of claim 4, wherein the power transmitter is configured to analyze the current sensing data corresponding to the power transmitter and the current sensing data corresponding to the power receiver at an interval of at least 20 ms or shorter.

7. The power transmitter of claim 4, wherein the power transmitter is configured to analyze the current sensing data corresponding to the power transmitter and the current sensing data corresponding to the power receiver at an interval between 4 ms and 20 ms.

8. The power transmitter of claim 1, wherein the diagnostic message received from the power receiver is a digital signal encoded using pulse width modulation.

9. The power transmitter of claim 1, the memory further including executable instructions that, when executed by the processor, causes the processor to:
receive, via the optical subassembly, communication from a remote network device.

10. The power transmitter of claim 1, wherein the power transmitter is included in a point-to-point power delivery topology.

11. The power transmitter of claim 1, wherein the power transmitter is included in a multipoint power delivery topology.

12. The power transmitter of claim 1, wherein the power transmitter is configured to transmit at least 2 kW of power over the hybrid cable.

13. The power transmitter of claim 1, the memory further including executable instructions that, when executed by the processor, causes the processor to:
conduct the fault detection test while transmitting the high voltage power.

14. The power transmitter of claim 1, wherein the power transmitter is configured to control transmission of the high voltage power in a pulsed power form.

15. The power transmitter of claim 1, wherein the power transmitter is configured to control transmission of the high voltage power in a direct power form.

16. The power transmitter of claim 1, wherein the optical subassembly includes a wavelength division multiplexer/demultiplexer configured to transmit signals to the power receiver in a predetermined dedicated wavelength within the optical fibers of the hybrid cable.

17. A fault-management power system comprising:
a power transmitter configured to:
control a power switch to disconnect the power transmitter from a power source during a system initialization mode;
control a low power switch to connect to a low power source and power a first optical subassembly;
determine a predetermined condition of whether at least one optical fiber port and at least one electrical port is connected to a hybrid cable, and control an optical data interface to transmit a connection request based on the determination;
receive, via the optical subassembly, a reply to the connection request;
receive, via the optical subassembly, a diagnostic message;
conduct a fault detection test; and
determine whether a power transmission condition is met based on at least the diagnostic message and the fault detection test, and control transmission of high voltage power based on the determination;
a power receiver configured to:
receive, via a second optical subassembly, the connection request from the power transmitter;
transmit, via the second optical subassembly, the reply to the connection request to the power transmitter;
obtain, from a current sensing circuit included in the power receiver, current sensing data corresponding to the power receiver;
transmit, via the second optical subassembly, the diagnostic message to the power transmitter, the diagnostic message including the current sensing data corresponding to the power receiver; and
receive the high voltage power from the power transmitter; and
a hybrid cable including both optical fibers and conductive wires, the hybrid cable coupled to the power transmitter and the power receiver, and wherein the first optical subassembly is configured to communicate with the second optical subassembly using the optical fibers, and wherein the high voltage power is transmitted using the conductive wires.

18. The fault-management power system of claim 17, wherein the power receiver is further configured to:
 encode the diagnostic message into a digital signal encoded using pulse width modulation.

19. The fault-management power system of claim 17, wherein the power transmitter is further configured to implement a test-the-tester process to:
 obtain, from a current sensing circuit included in the power transmitter, current sensing data corresponding to the power transmitter;
 obtain current sensing data corresponding to the power receiver from the diagnostic message;
 analyze the current sensing data corresponding to the power transmitter and the current sensing data corresponding to the power receiver; and
 determine whether the power transmission condition is met based on at least the fault detection test and the analysis of the current sensing data corresponding to the power transmitter and the current sensing data corresponding to the power receiver.

20. The fault-management power system of claim 17, wherein the power transmitter is further configured to:
 conduct the fault detection test while transmitting the high voltage power.

* * * * *